US011508226B2

(12) United States Patent
Solomon

(10) Patent No.: US 11,508,226 B2
(45) Date of Patent: Nov. 22, 2022

(54) INVENTORY CONTROL SYSTEM WITH INTEGRATED ID TAGS

(71) Applicant: Worthwhile Products, Rolling Hills Estates, CA (US)

(72) Inventor: Stanley B. Solomon, Rolling Hills Estates, CA (US)

(73) Assignee: Worthwhile Products, Rancho Palos Verdes, CA (US)

( * ) Notice: Subject to any disclaimer, the term of this patent is extended or adjusted under 35 U.S.C. 154(b) by 0 days.

(21) Appl. No.: 17/567,350

(22) Filed: Jan. 3, 2022

(65) Prior Publication Data

US 2022/0122437 A1    Apr. 21, 2022

Related U.S. Application Data

(60) Continuation-in-part of application No. 17/237,953, filed on Apr. 22, 2021, now Pat. No. 11,227,472, which is a division of application No. 17/039,357, filed on Sep. 30, 2020, now Pat. No. 11,037,422.

(60) Provisional application No. 63/022,811, filed on May 11, 2020.

(51) Int. Cl.
| G08B 21/00 | (2006.01) |
| G08B 13/24 | (2006.01) |
| H04W 4/80 | (2018.01) |
| H04L 67/1087 | (2022.01) |
| H04W 84/18 | (2009.01) |

(52) U.S. Cl.
CPC ..... *G08B 13/2462* (2013.01); *G08B 13/2431* (2013.01); *H04L 67/1091* (2013.01); *H04W 4/80* (2018.02); *H04W 84/18* (2013.01)

(58) Field of Classification Search
CPC ............ G08B 13/2462; G08B 13/2431; H04L 67/1091; H04W 4/80; H04W 84/18
See application file for complete search history.

(56) References Cited

U.S. PATENT DOCUMENTS

| 7,692,812 B2 * | 4/2010 | Schoedinger | .......... B41J 3/4075 358/1.18 |
| 9,761,104 B1 * | 9/2017 | Gleason | .................. G08B 21/24 |
| 2006/0145850 A1 * | 7/2006 | Krstulich | ........... G08B 13/1427 340/572.1 |
| 2009/0091452 A1 * | 4/2009 | Himmel | .................. G06Q 10/06 340/572.1 |
| 2009/0201850 A1 * | 8/2009 | Davis | ..................... G01S 5/0009 370/328 |
| 2009/0276089 A1 * | 11/2009 | Bartholomew | ......... G07F 17/42 40/6 |
| 2011/0309931 A1 * | 12/2011 | Rose | ..................... G01S 5/0009 340/572.1 |

(Continued)

*Primary Examiner* — Mark S Rushing
(74) *Attorney, Agent, or Firm* — Lowry Blixseth APC; Scott M. Lowry

(57) ABSTRACT

The inventory control system process includes steps for printing a circuit to a sheet stock having at least one ID tag formed therewith such that the circuit is carried by the ID tag, assigning a unique identification code to the circuit associated with the ID tag, removing the ID tag carrying the circuit from the sheet stock, associating the removed ID tag with a product, and entering the product into an inventory control system secured in connection with a user account accessible only by an authorized user associated with the user account, for real-time location tracking of the product thereof by way of the circuit.

35 Claims, 15 Drawing Sheets

(56) References Cited

U.S. PATENT DOCUMENTS

2021/0165501 A1\* 6/2021 Dai .................... H04W 4/80

\* cited by examiner

INVENTORY CONTROL SYSTEM WITH INTEGRATED ID TAGS

BACKGROUND OF THE INVENTION

The present invention generally relates to an inventory control system. More specifically, the inventory control system disclosed herein includes integrated ID tags printable with a home computer using conductive ink to form a trackable tag attachable to products that are non-electronic or otherwise do not have a tracking tag attached thereto.

Consumerism in the United States and throughout the world is a social and economic order that encourages the acquisition of goods and products. Not only do people continue to acquire goods and products over time, but, with added spending power, the rate at which goods and products are acquired can increase as well. As a result, it becomes increasingly difficult to track the ownership of products, and is certainly a time consuming and continual process. In this respect, certain inventory control systems have been designed to create a catalog of products, e.g., based on those products owned by a single person or owned by multiple persons within a household (e.g., parents, children, friends, etc.). Such inventory control systems may update the catalog of products periodically or in real-time in an effort to make sure the database remains accurate. Certain immovable (e.g., heavy) or relatively stationary goods such as home furnishings (e.g., couches, desks, beds, wall-mounted televisions, etc.) may be relatively easy to maintain in inventory because such goods, over time, tend to remain in a single location within the household. Moreover, such goods may also be relatively easy to track due to infrequent replacement (e.g., due to expense) and lack of portability (e.g., a sofa is unlikely to be moved from one room to another, or to a different location, without owner awareness). Although, consumers may still find benefits in maintaining such goods within an inventory control system, e.g., for purposes of finding parts, supplemental products, matching or coordinated products, etc. while at the store and away from the product or good in question.

Although, smaller, less expensive and highly portable products are typically far more difficult to track in real-time, such as reading glasses or keys. Central to the problem is the ever-changing location since these products are highly portable. For example, sunglasses or keys may travel with the owner in and among several destinations during the day, such as from home to the car, into an office, to a meeting, back to the office, then into the car for the commute home before being placed into a drawer in a house for the evening. In each instance, sunglasses and/or keys are prone to being misplaced (e.g., left in a home drawer, tucked away in the car glove box, or otherwise forgotten at work). Misplacement can be particularly problematic for those who have a large quantity of products and/or for the elderly who may have a tendency to forget where they last left a desired good or product (e.g., reading glasses). In other words, movement, increasing the acquired quantity of goods and products, and memory loss can all compound difficulties related to maintaining an accurate and up-to-date inventory (and location) of all goods and products owned by any particular person at any given point in time. For most people, it is not possible to retain a detailed mental inventory of all goods anyway, much less remembering all their locations. Even if one could, the goods may be moved by a third party unbeknownst to the owner anyway. Once misplaced, finding the lost good can be particularly arduous, and especially so for smaller and/or highly transportable goods.

As such, not being able to find a particular good (e.g., by failing to recall its location, being moved by a third party, etc.) is frustrating, and the process for trying to find the lost good is oftentimes a tedious, repetitive, and time-consuming task. The typical scenario is that the owner may spend time searching the house, car, or office for a sought after good, relying only on some "recollection" where the good was last seen. Without an accurate way to identify where the good may be located, the owner may spend a considerable amount of time searching the house, including, e.g., rummaging through cabinets, closets, storage boxes, etc. until the desired good is found. For more frequently used and moved goods (e.g., eyeglasses and/or keys), the searching process may involve walking around the house and looking on tables, chairs, within cabinets, drawers, in the garage, or even within cars. Oftentimes the owner will simply attempt to "retrace" steps in hopes of finding the lost or misplaced good. This, again, can be highly time consuming and may not yield efficient or ready results, e.g., if the owner cannot specifically remember enough of the day to accurately retrace where the good may have been left. As a result, the owner may not timely find the desired good and may give up looking (and possibly spend more money to buy another product of like characteristics to replace the presumably lost good).

Inventory control systems known in the art have used RFID tags to track products within an inventory control system. RFID technology uses radio waves to exchange information between a reader and an electronic tag attached to an object/good, such as for purposes of identification and/or tracking. Some of the most common electronic tags are passive and powered by an interrogation signal emitted from the reader. The amount of information and the distance the reader can interrogate the RFID chip varies by technology. For example, some electronic tags can only be read from several feet, while other tags can be read from much farther distances (e.g., beyond a line of sight with the reader). In product applications, RFID tags are typically concealed within product packaging or otherwise attached to the product itself (and removed at checkout). In this respect, RFID tags can provide more real-time information to the manufacturer and/or retailer since the tag includes an embedded circuit able to send and/or receive information wirelessly, such as when queried by a wireless reader nearby. Although, the RFID tag is generally thrown away with the product packaging or removed from the product at checkout and prior to use so the RFID tag is of no use to the owner after purchase.

One product known in the art that endeavors to address the issue of maintaining an inventory of certain easily movable goods in real-time is the Orbit line of products manufactured and sold by Global Shopping Network Pty Ltd ("GSN") of 2 Grosvenor Street, Suite 204, Bondi Junction, NSW Australia. More specifically, the Orbit products include a variety of electronic devices such as the "Orbit Keys", "Orbit Card", "Orbit Glasses", and "Orbit Stick-On" that have integrated wireless transmitters and/or receivers (e.g., Bluetooth technology) within a housing that can attach to a good desired to be tracked. The Orbit Glasses product, e.g., is a tracking device that includes an elongated box-like structure attachable to the arms/temples of a pair of glasses and is capable of syncing with a Smartphone by transmitting and/or receiving a wireless communication signal therewith over Bluetooth. The problem with the Orbit Glasses product is that the box-like structure that attaches to the glasses is bulky and uncomfortable. The same is true with respect to other products, such as the Orbit Keys and/or Orbit Stick- On, namely the housings retaining these electronic devices are relatively large compared to the size of the product the Orbit products are designed to track. The Orbit products must also be purchased separately and otherwise cannot be created by the owner on an as-needed basis. As such, new products purchased by the owner may get lost before another Orbit product can be purchased by the owner.

There exists, therefore, a significant need in the art for an inventory control system that utilizes one or more printable ID tags that can be made on demand such as by way of a home printer and conductive ink, and of which have a relatively light weight and size and that can attach to relatively small personal items such as eyeglasses, keys, and/or credit cards, without unduly increasing the size and weight thereof, while simultaneously enabling the user to identify and track the tagged product. The present invention fulfills these needs and provides further related advantages.

SUMMARY OF THE INVENTION

In one embodiment disclosed herein, an inventory control system process may include steps for printing a circuit to a sheet stock having at least one ID tag formed therewith such that the circuit is carried by the ID tag. Thereafter, a unique identification code may be assigned to the circuit associated with the ID tag for later use in location tracking of a product. In this respect, the ID tag carrying the circuit may be removed from the sheet stock and associated with a product desired to be identified and tracked within the inventory control system, such as by way of scanning a code (e.g., a barcode or a QR code) associated with the ID tag and the product. Here, the product entered into the inventory control system may be secured in connection with a user account that is accessible only by an authorized user associated with the user account, for real-time location tracking of the product thereof by way of the circuit.

In one embodiment, the ID tag may be an adhesively backed ID tag, and the associating step may include bending the adhesively backed ID tag and the circuit thereon about at least a portion of the product for attachment thereto, wherein the circuit remains communicatively operational thereafter. In some embodiments, the ID tag may be made from a flexible material that is bendable for attachment to something as small as an eyeglasses arm. The circuit may be a passive circuit formed from a conductive ink printed to the sheet stock, and the sheet stock may include at least two columns of ID tags with conductive circuits printed thereon. In another aspect of these embodiments, the circuit may be a plurality of circuits and the ID tag may be a plurality of ID tags, wherein each of the plurality of ID tags may have one of the plurality of circuits associated therewith.

The assigning step may further include printing the unique identification code or a QR code to the sheet stock and/or programming the circuit with the unique identification code. In one embodiment, the unique identification code may be a numerical code or an alphanumeric code, and the assigning step may further include embedding the unique identification code within the circuit. The unique identification code may be acquired from a local or a remote server, and in the embodiment where the unique identification code is acquired from the local server, the unique identification code may be a user customizable identification code pre or -post selected by the user. In the embodiment where the unique identification code is acquired from the remote server, the server may be a cloud-based server having a plurality of user accounts and the product may include a plurality of products, wherein each of the plurality of products are associated with at least one of the plurality of user accounts in the cloud-based server. Here, the entering step may include assigning an access right to each of the plurality of user accounts such that transmission of the real-time tracking information regarding each of the products associated with one of the plurality of user accounts is only with respect to the authorized user having access rights to the corresponding user account.

In another embodiment, an integrated ID tag as disclosed herein may include an adhesive at least partially disposed on a base layer of the integrated ID tag that is generally covered by a selectively removable protective layer having a surface area generally overlying the adhesive of the base layer. A printable surface of the base layer may have a conductive ink deposited thereon forming a resilient passive communication circuit that remains communicatively operational after the protective layer is removed to expose the adhesive and the base layer is at least partially bent for attachment to a product to be tracked in real-time, wherein the resilient passive communication circuit is accessible only by an authorized user associated with the integrated ID tag. In one embodiment, the passive communication circuit may remain communicatively operational after the base layer is bent upwards of 180 degrees.

The exposed adhesive may be applied to the base layer in a manner that permits bending to conjoin opposite ends of the base layer together, such as to facilitate attachment of the integrated ID tag to small objects. In this respect, in one embodiment, the integrated ID tag may have a size and weight relatively smaller than a paper sheet, and may be bendable for wrap-around attachment to an eyeglasses frame. Moreover, the resilient passive communication circuit may include a receiver and a transmitter, wherein the receiver may energize the resilient passive communication circuit in response to receiving a wireless communication signal. Once energized, the resilient passive communication circuit may send an outgoing communication signal with location information by way of the transmitter. The integrated ID tag may further include a unique identification code programmed into the resilient passive communication circuit, which may also be transmitted to a remote server by way of the transmitter. The unique identification code may be a sequential number, including one selected by the user.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
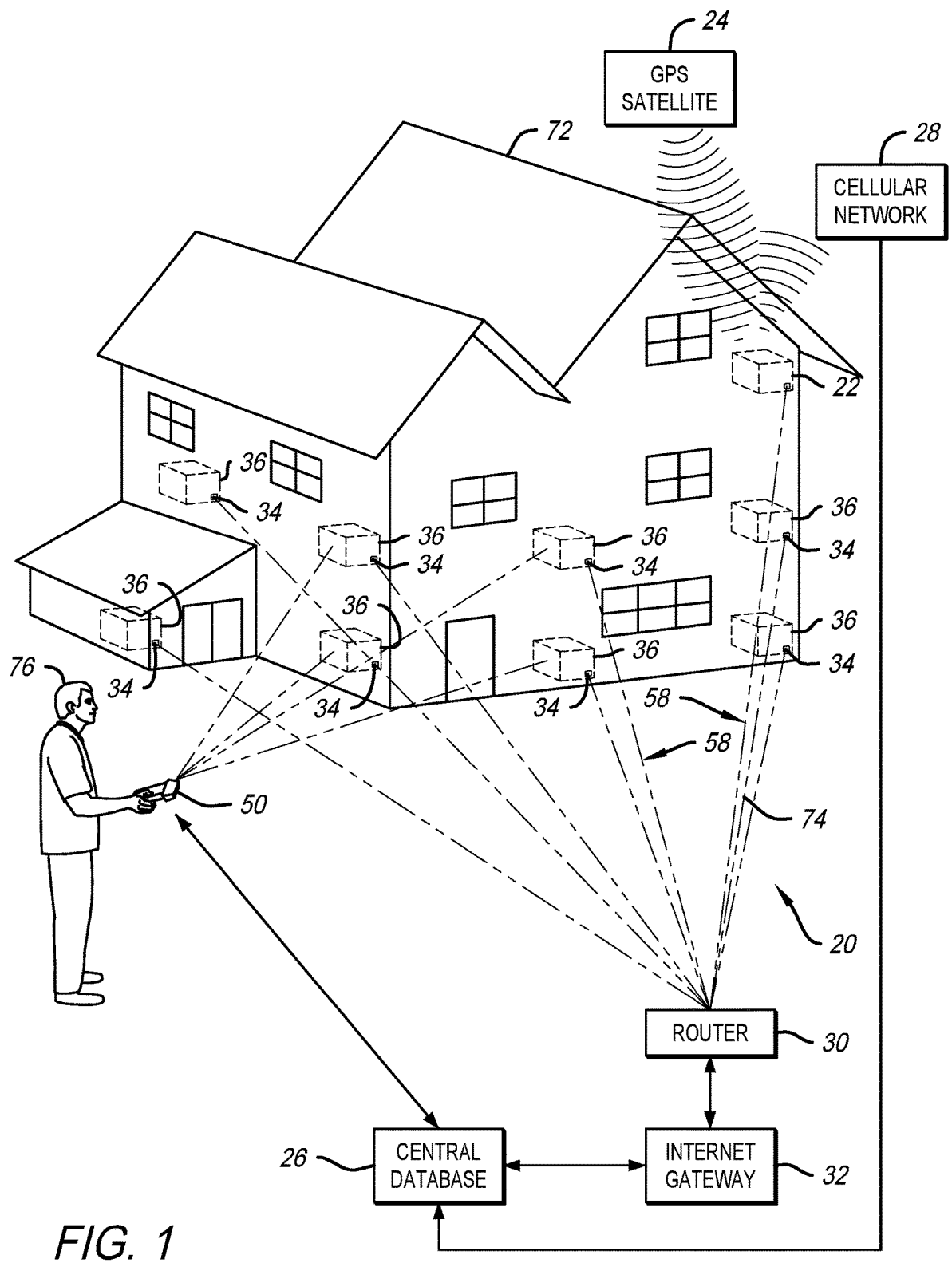
FIG. 1 is an environmental view illustrating one embodiment of a product location system disclosed herein, wherein multiple connected devices are communicating with one another, with a universal remote, and/or with a router.

As shown in the exemplary drawings for purposes of illustration, the present invention for a product location system is generally illustrated in FIGS. 1, 5, and 8-9 with respect to reference numeral 20. More specifically, the product location system 20 is designed for use with connected devices, namely stationary and/or portable electronic devices having a communication chipset for generating, transmitting, relaying, and/or otherwise communicating data information, including location information for tracking purposes. In some embodiments disclosed herein, a connected device is one where the communication chipset is integrated with other electronics upon manufacture (e.g., onboard). Examples might include Smartphones, laptops, computers, tablets, smart TVs, security cameras, motion detectors, etc. In other embodiments, a connected device may include products only able to generate, transmit, relay, and/or communicate data information, including location information for tracking purposes, after select attachment to a tag housing a comparable communication chipset. Examples might include attaching an aftermarket tag to a personal item or product otherwise unable to generate, transmit, relay, and/or communicate data information without the tag, such as keys, glasses, clothing, wallets, etc. As such, once the tag attaches to the personal item, the communication chipset therein may interact with the product location system 20 per the embodiments disclosed herein.

Figure 3:
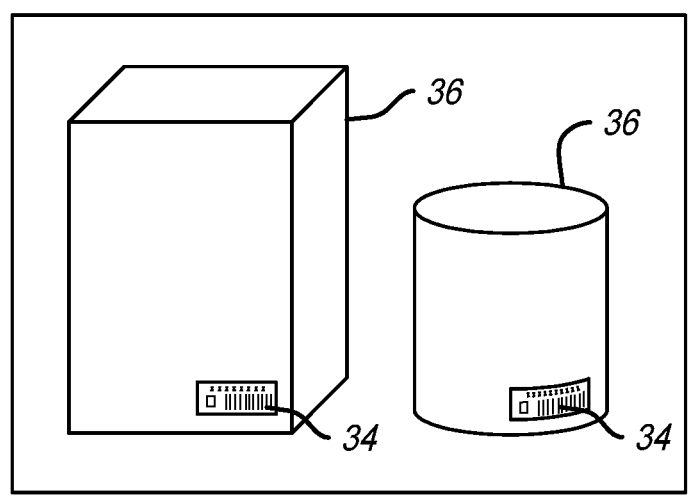
FIG. 3 is a perspective view of a pair of products having respective tags coupled thereto.

In this respect, FIG. 1 illustrates several example connected devices within one embodiment of the product location system 20. One such connected device may be an electronic device 22 having an onboard communications chipset that can, e.g., receive location information from a GPS satellite 24, and then relay that location information to a central database 26 by way of a cellular network 28 and/or by way of a home router 30 coupled to an internet gateway 32 in communication with the central database 26. Alternatively, the connected device may be an after-market tag 34 housing a comparable communications chipset (e.g., with GPS and/or wireless data communications capabilities). Here, the tag 34 may be designed to mechanically or adhesively attach, couple, or otherwise be associated with a wide variety of personal products/items, such as those generally illustrated in FIGS. 1 and 3 with respect to reference numeral 36; products that otherwise do not have an integrated and/or onboard communications chipset for location and/or data transmission purposes. Although, once tagged, the respective products 36 are able to communicate location information to the central database 26, such as by way of the router 30, the internet gateway 32, or otherwise in accordance with the embodiments disclosed herein. As such, the product location system 20 disclosed herein may utilize the location information obtained by the communication chipset onboard the electronic device 22 and/or the tag 34 for real-time tracking of one or more of the electronic devices 22 and/or one or more of the products 36. The location information may be periodically or continually communicated or transmitted to the central database 26 in real-time, the data of which may be remotely accessible in accordance with the embodiments disclosed herein.

Figure 2:
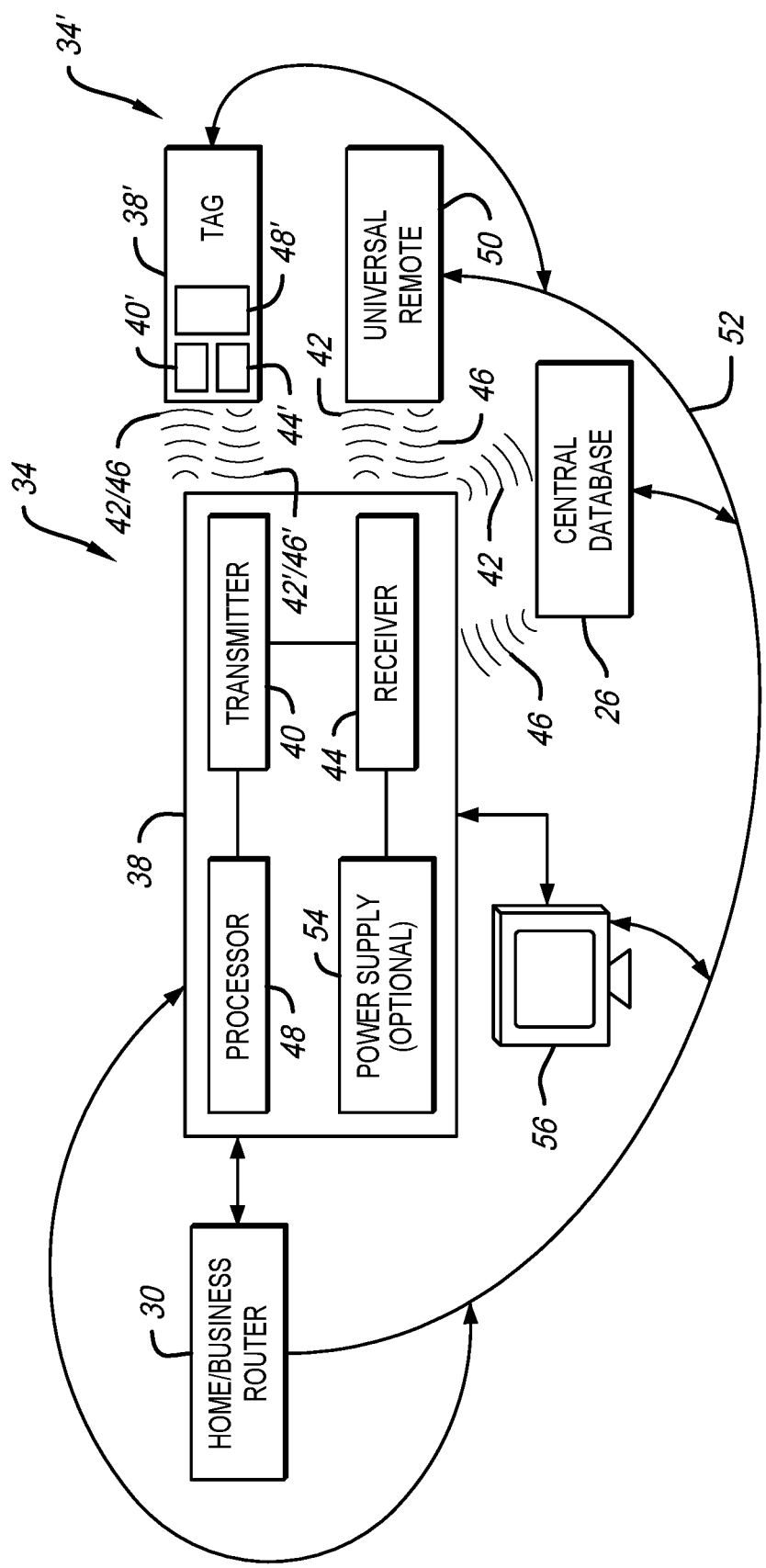
FIG. 2 is a diagram illustrating a tag having a transmitter and/or a receiver in communication with multiple connected devices.

More specifically, FIG. 2 illustrates that the tag 34 may include a housing 38 retaining a transmitter 40 for generating an outgoing communication signal 42 and/or a receiver 44 for accepting an incoming communication signal 46. An onboard processor 48 may generate the outgoing communication signal 42 and/or process the incoming communication signal 46. The outgoing communication signal 42 and/or the incoming communication signal 46 may be used to communicate data within the product location system 20 (e.g., similar to the type of data a Smartphone may communicate over a wireless network) and may be use for location identification (e.g., localized triangulation). As such, the tag 34 may be used within the product location system 20 to provide real-time location information that may be maintained in the central database 26.

One aspect of the product location system 20 is that maintaining real-time location information of any connected device is not necessarily reliant on the connected device being within communication range of a reader (e.g., in cases where tracking may occur within the supply chain by a passive or active RFID tag) or being within communication of a Smartphone (e.g., in cases of the "Orbit" products discussed in the background of the present application). Rather, as will become apparent from the embodiments disclosed herein, any of the electronic devices 22 and/or the tags 34 may communicate with one another and/or with any other connected devices disclosed herein, including third party connected devices having protocol compatible firmware or software installed thereon. As such, all connected devices may be able to produce and maintain real-time location information within an ad hoc peer-to-peer network, even in the absence of the reader or Smartphone. Such peer-to-peer communication further enables localized triangulation of the connected devices within the product location system 20, as discussed in more detail below.

Certainly, location information that can be derived from a local peer-to-peer communication network will be more specific than location information via GPS. In fact, peer-to-peer communication among the connected devices may make it possible to more specifically pinpoint the location of the connected devices to within a room in a house, or within a storage location (e.g., a drawer or cabinet) in a room (i.e., within 6 feet or less). This feature is certainly advantageous over other known inventory control systems that: (a) rely on GPS satellite locating systems that can only provide location information within about 15 feet of the querying Smartphone; (b) require that the Smartphone be within actual communication range of a tracked product to generate location information based on the then current GPS location of the Smartphone; and (c) require deployment of localized readers and/or sensors within strategic locations, in an effort to more specifically identify location information. In other words, known inventory control systems are limited by the granularity of the GPS location information and limited by requiring that the querying device be within actual communication range of the connected device to operate properly and/or effectively.

Specifically, FIG. 2 illustrates one embodiment wherein the tag 34 is generating the outgoing communication signal 42 with its transmitter 40 for select reception and processing by the receiver 44' of another tag 34' nearby. In this example, the outgoing communication signal 42 generated by the tag 34 is interpreted as the incoming communication signal 46 that may require processing by the onboard processor 48' embedded within the housing 38' of the tag 34'. The tag 34' may reciprocate, namely generate its own outgoing communication signal 42' for select reception and processing by the receiver 44 of the tag 34 (of which the tag 34 interprets the outgoing communication signal 42' as its own incoming communication signal 46'). As such, in this example, each of the tags 34, 34' are able to engage in bilateral communication with one another by way of the respective on-board transmitters 40, 40' and receivers 44, 44'. Of course, the respective transmitters 40, 40' and the respective receivers 44, 44' may communicate wirelessly (e.g., over Wi-Fi, Bluetooth, a cellular network, GPS, or another long or short-range wireless communication protocol such as near field communication ("NEC")) or by wire line (e.g., Ethernet/RJ45, Ethernet over power, etc.).

Moreover, as also illustrated in FIG. 2, the tag 34 may communicate directly with the central database 26 by way of the aforementioned outgoing communication signal 42 (e.g., in embodiments where the central database 26 may be local). Similarly, the central database 26 may reciprocate with its own signal interpreted by the tag 34 as the incoming communication signal 46. As such, the tag 34 may provide location specific information directly to the central database 26 by wireless or wired communication therewith.

Moreover, the tag 34 may push location information to a universal remote 50, or the universal remote 50 may pull location information from the tag 34. Location information acquired by the universal remote 50 may also be relayed to the central database 26, such as over a wired or wireless communication network 52. Of course, the communication network 52 may include the Internet, an intranet, or another comparable wireless and/or wired communication network capable of unilateral and/or bilateral communication in and among the central database 26 and/or any of the communication devices disclosed herein or known in the art, including, e.g., any connected devices (e.g., the electronic device 22 and/or the tag 34), the router 30, the internet gateway 32, the universal remote 50, etc.

In general, the universal remote 50 may be any electronic device capable of generating and/or receiving wireless and/or wired data communications within the product location system 20, and may include Smartphones, cell phones, laptops, tablet PCs, personal digital assistants (PDAs), single or multi-purpose remote controls, wristwatches, TV's, etc. Of course, the universal remote 50 may have the ability to send and/or receive data information (e.g., product identity and/or location information) over a wireless network (e.g., Wi-Fi, cellular network such as 5G or 4G LTE, 3G, etc., Bluetooth, NFC, or another long or short-range wireless communication network) or a wired network (e.g., Ethernet, fiber network, etc.).

The universal remote 50 may be designed to communicate with tags 34 that are either passive or active. For passive tags, the product location system 20 may be used or deployed in environments that do not require that the tag 34 have the ability to self-power the outgoing communication signal 42. Here, operation of the passive tag 34 necessarily requires the incoming communication signal 46 to power the onboard processor 48. In these embodiments, powered devices such as the central database 26 (e.g., powered by a mains power supply) or the universal remote 50 (e.g., powered by a rechargeable battery) may generate the incoming communication signal 46 having the requisite energy profile to power the onboard processor 48 and any other related chipsets within the housing 38, such as powering the transmitter 40 to generate and send the outgoing communication signal 42 containing location information of the tag 34.

In alternative embodiments, the tag 34 may be an active tag that derives power from an onboard power supply 54, such as a rechargeable battery or replaceable non-rechargeable battery. In other embodiments, the onboard power supply 54 may simply be a connector for coupling the tag 34 to a mains power supply to derive continuous power therefrom. Of course, the power supply 54 is optional given that the product location system 20 may also be compatible with passive tags, as mentioned above. As such, the optional power supply 54 may operate the transmitter 40, the receiver 44, and/or the onboard processor 48, e.g., to proactively transmit location information to the central database 26, the universal remote 50, etc.

FIG. 2 also generally illustrates that the tag 34 may communicate with third party connected devices, such as the home or business router 30, a smart TV 56, etc. Of course, the tag 34 may communicate with virtually any connected device, including those that may have "smart" capabilities or interfaces (e.g., wired or wireless home security cameras, door sensors, motion detectors, computers, printers, audio and/or visual electronic devices such as receivers, smart switches, light bulbs, etc.).

In an example embodiment illustrated in FIG. 2, each of the central database 26, the router 30, the tags 34, 34', the universal remote 50, and/or the smart TV 56 may communicate with one another over a common interface, such as the communication network 52. Although, the product location system 20 does not require that all connected devices (e.g., the electronic device 22, the central database 26, the router 30, the tags 34, the smart TV 56, etc.) be connected directly to the communication network 52 for proper operation. Rather, as discussed in more detail below, one or more connected devices may create an ad hoc peer-to-peer communication network to make sure location data continually makes its way back to the central database 26, even though one or more of the connected devices may not be able to directly communicate therewith over the communication network 52. Such feature enables the central database 26 to remain better updated regarding the real-time location of the connected devices entered into the product location system 20, even in scenarios where a Smartphone may not be within transmittable distance of one or more of the connected devices.

Figure 4:
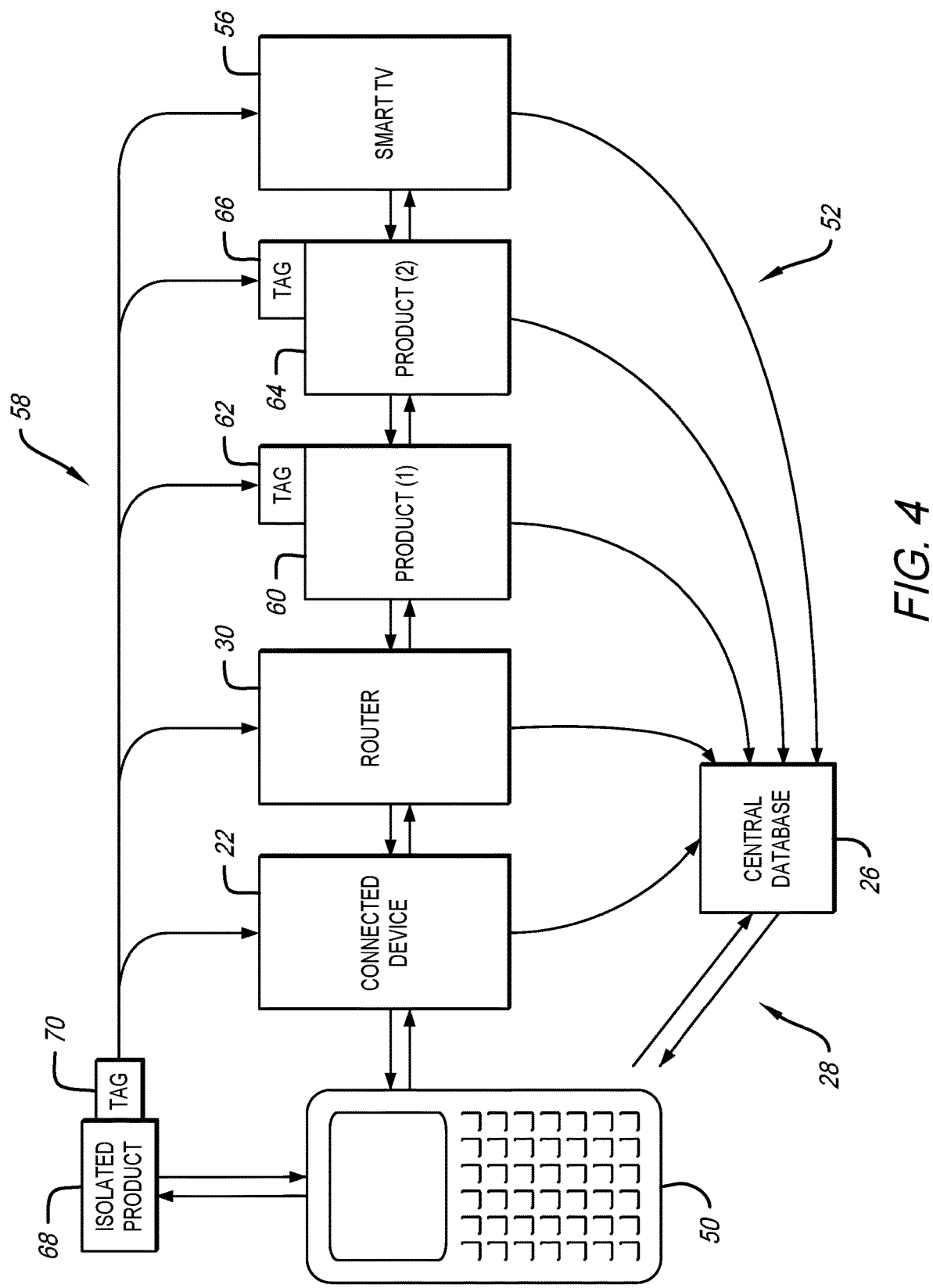
FIG. 4 is a diagrammatic view illustrating an ad hoc peer-to-peer communication system.

FIG. 4 is a diagram illustrating an ad hoc peer-to-peer communication network 58 deployed by the product location system 20 disclosed herein. As discussed in more detail below, the ad hoc peer-to-peer communication network 58 is designed to keep the central database 26 updated more frequently relative to known inventory control systems by use of intercommunication of the connected devices, even when one or more of the connected devices may not be within transmittable distance of the central database 26 and/or the universal remote 50. In effect, location information may be shared or bounced off various connected devices able to communicate or repeat said location information throughout the ad hoc peer-to-peer communication network 58.

As such, FIG. 4 illustrates one embodiment where the ad hoc peer-to-peer communication network 58 is formed in and among a number of connected devices, including the electronic device 22, the router 30, a first product 60 having a first tag 62 coupled thereto, a second product 64 having a second tag 66 coupled thereto, and the smart TV 56. As illustrated, each of the electronic device 22, the router 30, the first product 60, the second product 64, and/or the smart TV 56 may communicate with one another within the ad hoc peer-to-peer communication network 58, thereby effectively creating a communication web or communication bubble. In this respect, location information may essentially be repeated within this communication web or communication bubble through each of these connected devices in real-time. Moreover, any one of these connected devices may further communicate said location information to the central database 26 (e.g., over the communication network 52) or directly to the universal remote 50 when in range (FIG. 4 illustrating only that the electronic device 22 is in current range). The universal remote 50, in turn, may be in bilateral communication with the central database 26 (e.g., over the cellular network 28) to relay said location information to the central database 26.

Powered devices such as the electronic device 22, the router 30, and/or the smart TV 56, in the example illustrated in FIG. 4, may periodically generate the outgoing communication signal 42 to query the surrounding area for connected devices that may be tracked by the product location system 20 in the central database 26. Such querying may occur periodically (e.g., every hour or day) or be based on an environmental conditions, such as sensing movement. As such, powered connected devices within the product location system 20 may simply respond to the outgoing communication signal 42 with location information that the querying powered connected device may, in turn, communicate to the central database 26 and/or the universal remote 50 (when in communication range). Accordingly, even if the universal remote 50 is no longer within communication range of one or more of the electronic device 22, the router 30, the first product 60, the second product 64, and/or the smart TV 56, the central database 26 may continue to receive location information from one or more other connected devices in communication therewith, such as by way of the communication network 52. Accordingly, connected devices that may not have a direct line of communication with the universal remote 50 and/or the central database 26, may still be able to communicate location information thereto. The connected devices may selectively operate their communication chipsets (e.g., periodically turning them on and/or off) to communicate location information on a periodic basis for battery saving purposes. In the case of Bluetooth communications, the connected devices may selectively couple and/or de-couple to one another for similar reasons. Location information data exchange may also be triggered by a motion sensor (e.g., integrated into a light switch within a room).

Another aspect of the ad hoc peer-to-peer communication network 58 is the ability to communicate location information of an isolated product 68 to the central database 26, despite the isolated product 68 having no direct connection to the universal remote 50 and/or the communication network 52. Initially, as illustrated in FIG. 4, the isolated product 68 may have a communication tag 70 associated therewith within range and capable of unilateral and/or bilateral communication with the universal remote 50. The communication tag 70 may also be able to communicate directly with any of the connected devices, including the electronic device 22, the router 30, the first tag 62 of the first product 60, the second tag 66 of the second product 64, and/or the smart TV 56, as illustrated in FIG. 4. One aspect of the ad hoc peer-to-peer communication network 58 allows the isolated product 68 to communicate location information to the central database 26 through the universal remote 50; although, in the event the universal remote 50 is carried away to another location, the tag 68 may become isolated by virtue of losing communication with the universal remote 50. In known inventory control systems, the isolated product 68 is no longer able to communicate location information to the central database 26 as a result of no longer being in communication range of the universal remote 50 and/or the communication network 52.

Although, the ad hoc peer-to-peer communication network 58 disclosed herein allows the isolated product 68 to continue communicating with one or more of the connected devices including, e.g., the electronic device 22, the router 30, the first tag 62 of the first product 60, the second tag 66 of the second product 64, and/or the smart TV 56, as illustrated in FIG. 4, whereby the electronic device 22, the router 30, the first tag 62 of the first product 60, the second tag 66 of the second product 64, and/or the smart TV 56 may transmit or relay the location information of the isolated product 68 to the central database 26 by way of being directly coupled to the communication network 52. That is, location information transmitted from the isolated product 68 may be repeated through the ad hoc peer-to-peer communication network 58 until that location information can be transmitted to the central database 26 over the communication network 52. In fact, location information for the isolated product 68 may be repeated through multiple of the connected devices before being communicated to the central database 26 over the communication network 52.

In one embodiment, location information for the isolated product 68 may repeat through one or both of the tags 62, 66 before being transmitted through the communication network 52 to the central database 26. Alternatively, the isolated product 68 may first communicate location information through one or more of the tags 62, 66, which then repeat the location information to the next closest or most efficient communication device (e.g., the router 30 or a hub designed for such communications) en route to the central database 26 over the communication network 52. In another example, the isolated product 68 may first communicate location data to the smart TV 56 (also not within communication range of the central database 26), which then communicates the location information to the in-range second product 64 by way of the second tag 66, which then repeats the location information to the universal remote 50, which then eventually repeats the information to the central database 26. As such, it will be readily apparent to a person of ordinary skill in the art that the ad hoc peer-to-peer communication network 58 can quickly and easily repeat information in and/or among the various connected devices coupled thereto (e.g., such as those within wireless communication range) to ensure that the central database 26 remains up-to-date with the location information of each connected device entered into the product location system 20.

Of course, the ad hoc peer-to-peer communication network 58 may be deployed throughout a house 72 as illustrated, e.g., in FIG. 1. Here, FIG. 1 illustrates multiple of the products 36 within the house 72 communicating location information to the router 30 over an internal network 74 and/or communicating location information to the universal remote 50 held by a user 76. The router 30 or the like may be positioned centrally within the house 72 to deploy the internal communication network 74 in wireless communication with each of the tags 34 associated with each of the products 36 as generally illustrated therein. As such, in this embodiment, the ad hoc peer-to-peer communication network 58 may operate by way of the router 30 communicating location data from each of the coupled tags 34 through the internet gateway 32 to the central database 26, which may be located onsite or offsite.

Moreover, as also illustrated in FIG. 1, the universal remote 50 may periodically communicate with one or more of the tags 34 when the user 76 carries the universal remote 50 within communication range thereof. Even when at the house 72, the universal remote 50 may communicate directly with the off-site central database 26 (e.g., by way of the cellular network 28 and/or the router 30/internet gateway 32). Accordingly, the central database 26 may receive location information from both the router 30 and/or the universal remote 50. Then, when the user 76 removes the universal remote 50 from the house 72, i.e., the universal remote 50 is no longer in wireless communication with the connected devices (e.g., the electronic device 22 and/or any of the tags 34 coupled to the products 36 within the house 72), the router 30 can continue to relay location information to the central database 26 by way of the internet gateway 32. To this end, the universal remote 50 carried offsite by the user 76 can continue to obtain location information from the central database 26 (e.g., over the cellular network 28) despite not being at the house 72.

Figure 5:
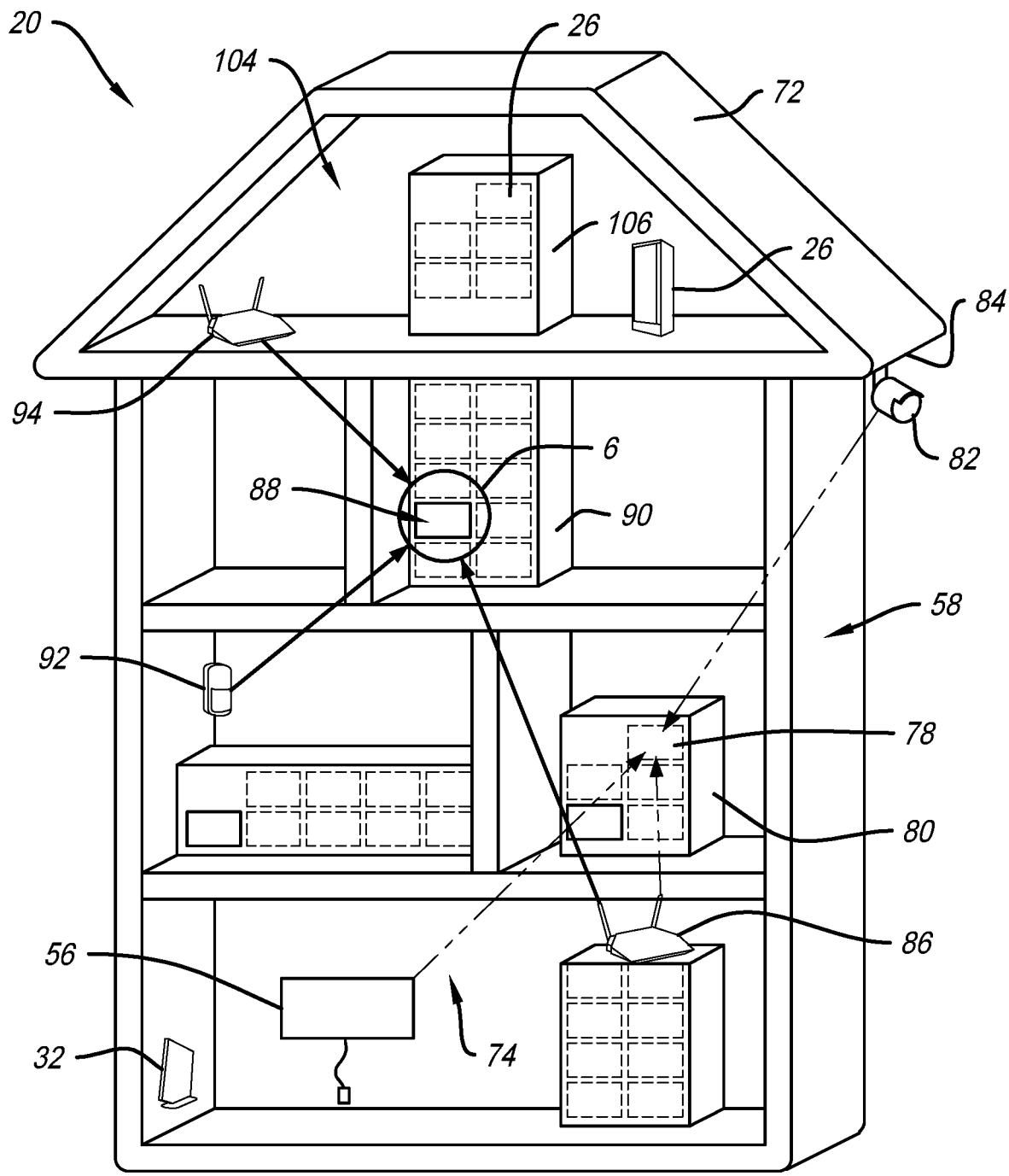
FIG. 5 is an internal view of a house deploying the product location system, and specifically triangulating the location of multiple connected devices therein.

FIG. 5 illustrates another aspect of the product location system 20 disclosed herein, namely with respect to utilizing various connected devices for localized triangulation within the house 72. In one example, a product 78 within a storage unit 80 may be specifically located within the house 72 by the product location system 20 by triangulating the relative wireless communication strength of the smart TV 56, a security camera 82 hanging from an eave 84, and a lower level mesh router 86. In this respect, these connected devices may communicate over the localized ad hoc peer-to-peer communication network 58 to provide location information having a higher triangulated granularity than comparable GPS-based systems known in the art. Thus, rather than simply identifying that the product 78 is within the house 72, the ad hoc peer-to-peer communication network 58 can triangulate the specific location of the product 78 to within the storage unit 80.

In another example illustrated in FIG. 5, a tagged product 88 stored within a cabinet 90 may similarly be specifically located within the house 72 by triangulating the relative communication strength of the lower level mesh router 86, a mid-level motion sensor 92, and/or an upper level mesh router 94. Although, of course, other connected devices in the house 72 could be used for such triangulation purposes. For example, the product location system 20 could run multiple triangulation scenarios using multiple combinations of the connected devices within the house 72 to more accurately identify the location of a desired product. This may be especially so when the user 76 searches for a specific product within the universal remote 50.

Figure 6:
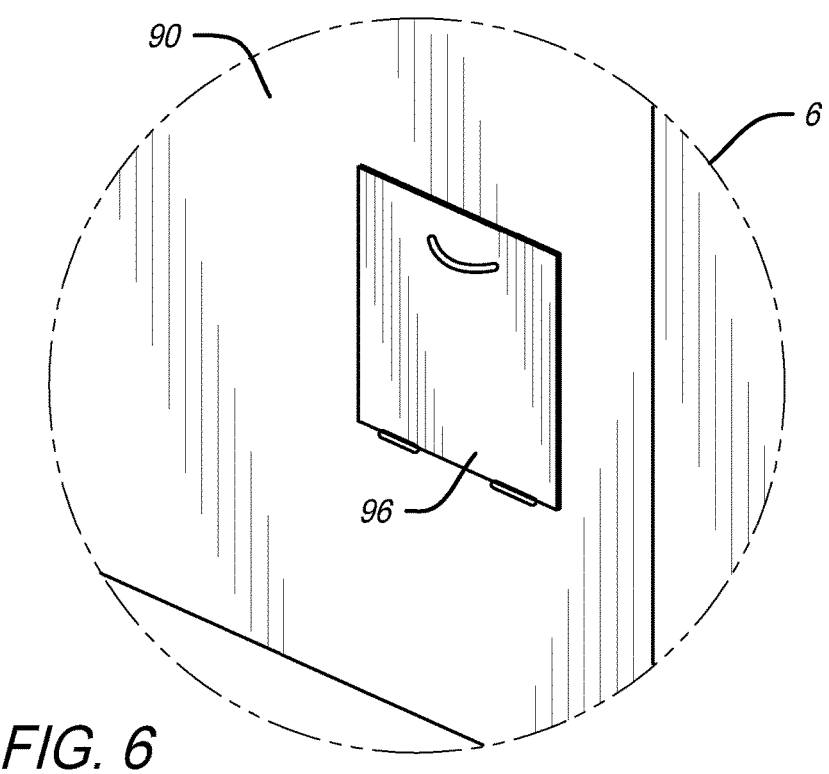
FIG. 6 is an enlarged perspective view taken about the circle 6 in FIG. 5, further illustrating a drawer of a cabinet.
Figure 7:
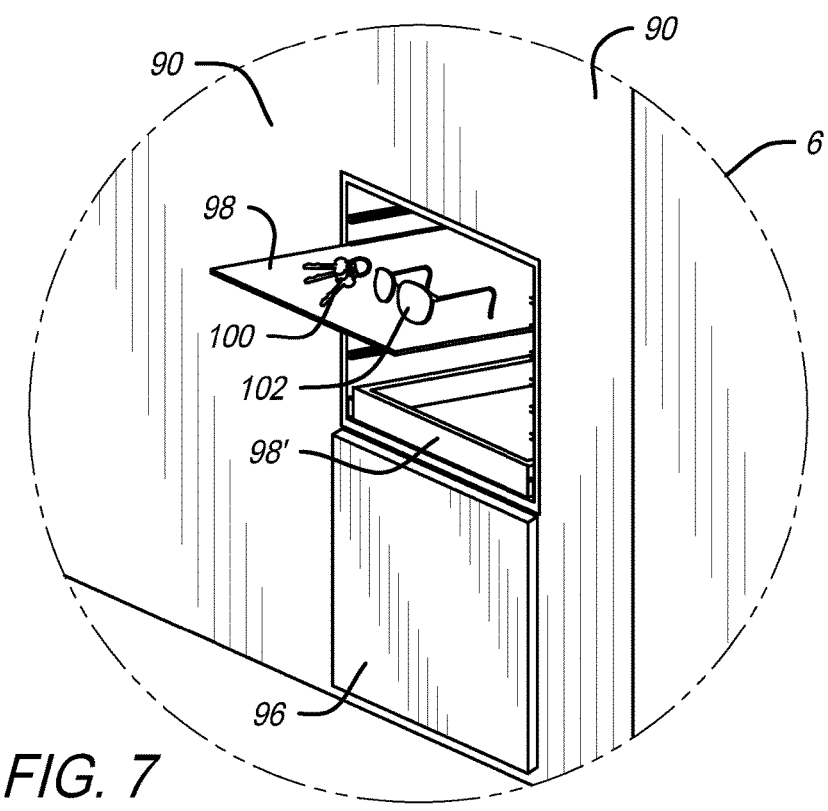
FIG. 7 is an enlarged perspective view similar to FIG. 6, further illustrating the drawer in an open position with a slide out shelf presenting a set of keys and a pair of glasses thereon.

In this respect, FIG. 6 illustrates that the product location system 20 may identify a particular cabinet drawer 96 within the cabinet 90 where the tagged product 88 may be located. To this end, FIG. 7 illustrates the cabinet drawer 96 in an open position exposing a slide out shelf 98 having a set of keys 100 and a pair of glasses 102 thereon. While not shown, the set of keys 100 and the pair of glasses 102 may each include a tag coupled thereto that enables the ad hoc peer-to-peer communication network 58 to triangulate their location thereof to within the cabinet drawer 96.

A person of ordinary skill in the art will readily recognize that there may be an unlimited number of combinations for using the connected devices as part of the ad hoc peer-to-peer communication network 58 to more specifically triangulate the location of connected devices as part of the operation of the product location system 20. Additionally, while the embodiments discussed above disclose use of three connected devices to triangulate location information, more or less than three connected devices may be used to ascertain location information with varying degrees of specificity. For example, using fewer than three connected devices may produce less specific location information than using more than three connected devices to ascertain location information of a desired connected device within the product location system 20.

In another alternative aspect of the embodiments disclosed herein, FIG. 5 illustrates that the central database 26 may be located within an attic 104 the house 72 (i.e., onsite/local as opposed to remote/offsite). In this embodiment, the central database 26 may communicate with the internal communication network 74 by way of the closer upper level mesh router 94 or the farther lower level mesh router 86 (assuming the central database 26 is in communication range of one or both). Moreover, the central database 26 may also communicate with the universal remote 50 through either of the routers 86, 94 and by way of the Internet gateway 32. Here, the universal remote 50 may receive transmitted location information from the central database 26 while the universal remote 50 is offsite.

Moreover, the product location system 20 may more accurately generate location information over time by analyzing movement of connected devices within, e.g., the internal communication network 74. For instance, connected devices such as the lower level mesh router 86, the upper level mesh router 94, and/or any other connected devices that help form the internal communication network 74 and otherwise remain relatively stationary may generate a distance footprint for better tracking the location of movable connected devices within the product location system 20. More specifically, the mesh routers 86, 94 may learn the location of handoff zones by measuring relative signal strength as connected devices move through the house 72. For instance, the product location system 20 may ascertain a specific area in the house 72 where the connected device moves from a location in strong communication with the lower level mesh router 86 (and little or no communication with the upper level mesh router 94) to a location having strong communication with the upper level mesh router 94 (and little or no communication with the lower level mesh router 86). Of course, the product location system 20 may also measure the signal strength relative to other connected devices, e.g., the motion sensor 92 and/or the security camera 82 hanging from the eave 84 illustrated in FIG. 5, to provide further relative distance estimation to better identify a triangulated location of connected devices within the house 72 at any given point in time. Logic within the product location system 20 may also take into consideration that certain connected devices may have stronger signal generation than others. For instance, the mesh routers 86, 94 may have a longer and/or stronger wireless communication range signal than, e.g., the security camera 82 or the mid-level motion sensor 92. Here, the product location system 20 may make appropriate distance approximations based on the hardware and/or software characteristics of each connected device to develop a location profile that enables the user 76 to more quickly and accurately find one or more of the connected devices entered into the product location system 20. The product location system 20 may also develop a profile specific for each ad hoc peer-to-peer communication network and/or internal communication network 74 as well. In this respect, such learning capabilities may aid in generating higher accuracy location information for connected devices that move within the house 72.

Figure 8:
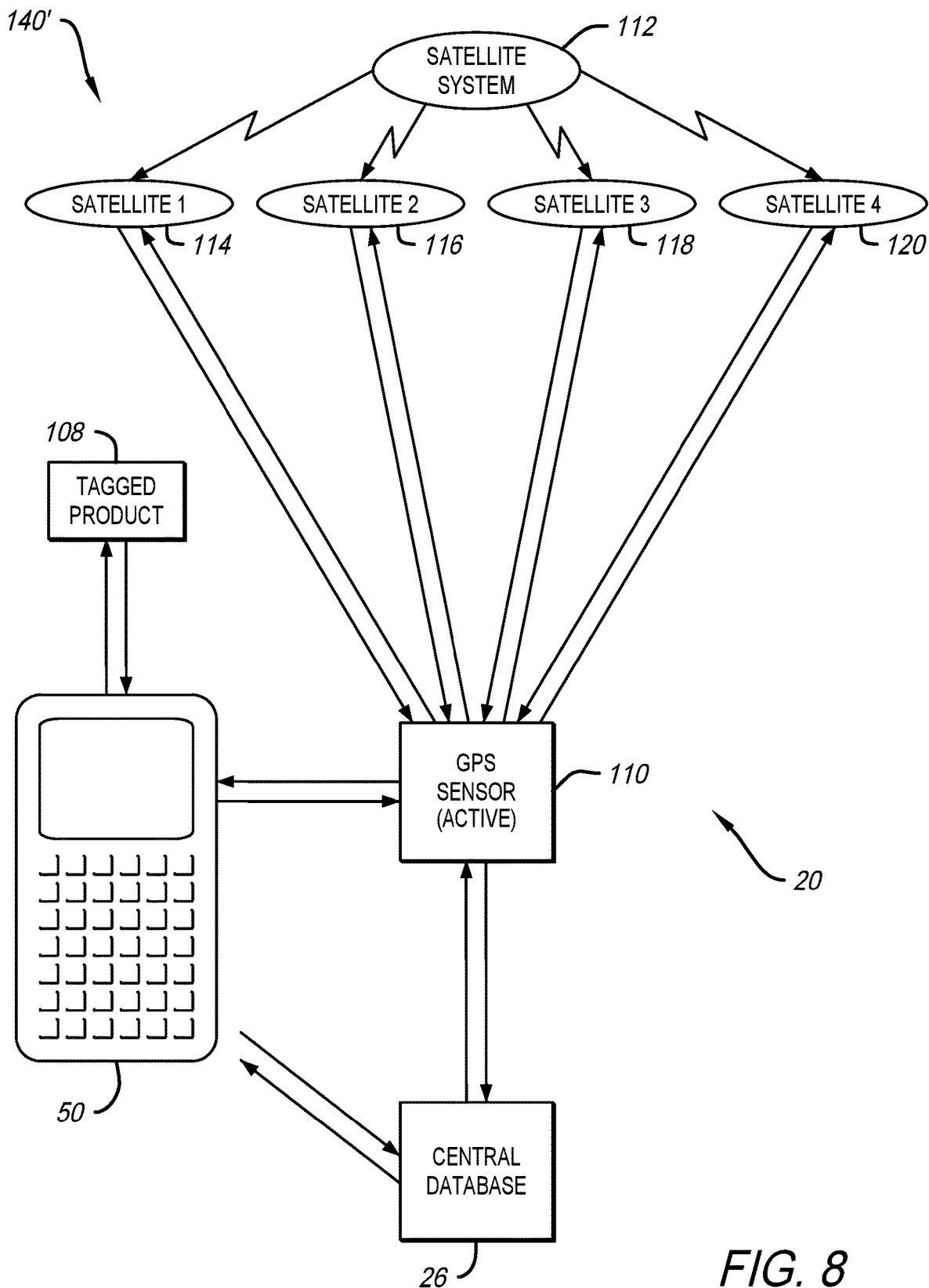
FIG. 8 is a diagrammatic view illustrating recording location information of a tagged connected device using GPS.

FIG. 8 illustrates another aspect of the product location system 20, namely with respect to recording location information when a tagged product 108 may not be able to communicate within the ad hoc peer-to-peer communication network 58. Here, the universal remote 50 may initially communicate with the tagged product 108 to obtain its product information for storage in the central database 26. Of course, while the universal remote 50 illustrated in FIG. 8 is a Smartphone, the universal remote 50 may also be any device generally disclosed herein and/or capable of scanning and/or reading information on the tagged product 108. For example, the universal remote 50 may also include a scanner compatible with a barcode, a reader compatible with RFID circuits, a camera for taking photographs of the tagged product 108, or a receiver for receiving data through automatic and/or manual user entry, in the event the tagged product 108 is incapable of being read or scanned. The universal remote 50 may be wireless (e.g., such as the aforementioned Smartphone or cell phone, or a personal digital assistant (PDA), computer, netbook, etc.) or may be a device permanently or removably affixed to a portion of a structure (e.g., the house 72). The universal remote 50 may also be capable of transmitting and/or receiving wireless signals, such as radio frequency signals and/or infrared light beams. The transmitters and receivers integrated into the universal remote 50 may be configured to send/receive high frequency GPS signals and low frequency RFID signals.

Moreover, a person of ordinary skill in the art will readily recognize that the devices compatible with the product location system 20 disclosed herein may operate at any one of a number different wireless frequencies, including AM radio frequencies, shortwave frequencies, citizen's band (CB) frequencies, radio frequencies, television station frequencies, FM radio frequencies, and high-level television station frequencies. For instance, in the United States, a cell phone-based universal remote 50 may operate within the 824-849 MHz range. If the universal remote 50 utilizes cordless telephone technology for shorter-range communication, the universal remote 50 may operate at about 900 MHz. In another embodiment, the universal remote 50 may be capable of operating within a 1227-1575 MHz range for purposes of compatibility with a global positioning system ("GPS"). The universal remote 50 may also communicate through landlines or other wired technology, instead of wirelessly.

The universal remote 50 may be in relatively continuous communications with the database 26 (e.g., over a cellular data network or home Wi-Fi network); although, of course, it is not necessary for the universal remote 50 to be in constant communication with the central database 26. In this respect, the universal remote 50 may periodically communicate with the central database 26 (e.g., every hour or every day), such as to preserve battery life, or the universal remote 50 may communicate with the central database 26 on demand (e.g., when the user 76 endeavors to find one or more connected devices). In one embodiment, the central database 26 may continuously receive real-time location information from the connected devices as discussed in detail herein, including when a connected device is moved from room-to-room or from location-to-location. That location information may then be pushed to the universal remote 50.

The central database 26 may be remote from the universal remote 50 and/or any of the connected devices, as briefly disclosed above with respect to FIGS. 1 and 5. In some cases, the central database 26 may be located offsite in a secure facility or for use as a backup system. Alternatively, the central database 26 may be stored locally such as in the attic 104 (FIG. 5) or a basement of the house 72. The central database 26 could also be stored within a storage closet or other location that a business may designate (e.g., in the office building 122) to house electronic items such as computers or servers. The universal remote 50 and the central database 26 may be in real-time bi-lateral communication (i.e., the universal remote 50 may be able to initiate and/or send information to the central database 26 and the central database 26 may be able to initiate and/or send information to the universal remote 50 as needed and/or desired). Accordingly, location information regarding any of the connected devices entered into the product location system 20 may also be stored locally on the universal remote 50 (e.g., for offline use) and/or remotely in the central database 26 (e.g., for on-demand access and/or use). In one embodiment, the central database 26 may be an off-site backup database primarily used to retrieve information in the event the universal remote 50 is broken or misplaced; or a second universal remote 50 is required for use with product location system 20, such as if the user 76 purchases a new Smartphone.

As further illustrated in FIG. 8, the universal remote 50 may also operate seamlessly with a GPS sensor 110 to locate one or more of the connected devices in the event, e.g., the tagged product 108 is located outside the range of other connected devices capable of localized communication therewith for purposes of providing specific triangulated location information, as disclosed above. At the same time, the GPS sensor 110 may also be in wireless communication with a satellite system 112, which may include at least three satellites, namely a first satellite 114, a second satellite 116, and a third satellite 118. The satellites 114, 116, 118 may operate together to locate the general location of the universal remote 50 for purposes of generally identifying the location of the connected devices when the universal remote 50 is within communication range thereof. For example, the satellites 114, 116, 118 may be able to locate the general latitude, longitude and elevation of the universal remote 50. A fourth satellite 120 may supplement the first through third satellites 114, 116, 118 in the event one of the first through third satellites 114, 116, 118 lose communication, breaks, becomes non-functional, or otherwise drifts out of range. In essence, the fourth satellite 120 fills in for and replaces one of the non-operational satellites 114, 116, 118. The satellites 114, 116, 118 then relay latitude, longitude, and elevation information to the GPS sensor 110, which is then communicated to the universal remote 50 and/or the central database 26. In FIG. 8, the universal remote 50 and/or the central database 26 would then associate location information for the tagged product 108 based on the approximate position of the universal remote 50 relative thereto to establish an approximate distance/route based on use of the satellite system 112. That is, the product location system 20 may ascertain the general location of the universal remote 50 by way of the satellite system 112, then more specifically identify the location of the tagged product 108 based on the wireless signal strength of the universal remote 50 relative thereto. As such, this will help the user 76 more quickly find connected devices within the product location system 20, especially relative to just using a GPS system alone.

The GPS sensor 110 integral with the universal remote 50 may not only provide location information for the tagged product 108, but also coordinated directions (e.g., walking directions, driving directions, public transportation, etc.) in real-time. For example, the universal remote 50 may connect to the Internet to access the location of the tagged product 108 from the central database 26. The coordinates of the tagged product 108 provided by the central database 26 may integrate into an online map system (e.g., Google maps or the like) running on the universal remote 50. The online map may also provide directions to guide the user 76 to the location of the tagged product 108. In this regard, the GPS sensor 110 may help the user 76 locate the tagged product 108 with the universal remote 50. The GPS sensor 110 may communicate general location information to the universal remote 50 to identify a general area wherein the tagged product 108 may be located (e.g., within 15 feet). When the user 76 enters the general location of the tagged product 108, the universal remote 50 may be able to actively scan for the tagged product 108 (e.g., over the ad hoc peer-to-peer communication network 58) to determine the more specific location of the tagged product 108 (or to determine if the tagged product 108 may have been moved). In this respect, the universal remote 50 may be designed to actively scan for products within a general location based on the coordinates obtained by the GPS sensor 110. This may also help ensure that the location information in the central database 26 for any connected devices within range of the universal remote 50 remain updated in real-time. Moreover, such feature may help preserve the battery life of the universal remote 50, namely by activating the scanning feature only when within a previously identified GPS location where connected devices may be located. In places such as the house 72, the scanning feature my only activate once every couple days, or may activate if a particular connected device has not been logged into the central database 26 after a predetermined duration (e.g., one day, week, month, year, etc.). The scanning feature may also be activated by geo-location, such as when the user 76 arrives back to the house 72 (e.g., after being away for some predetermined duration).

Figure 9:
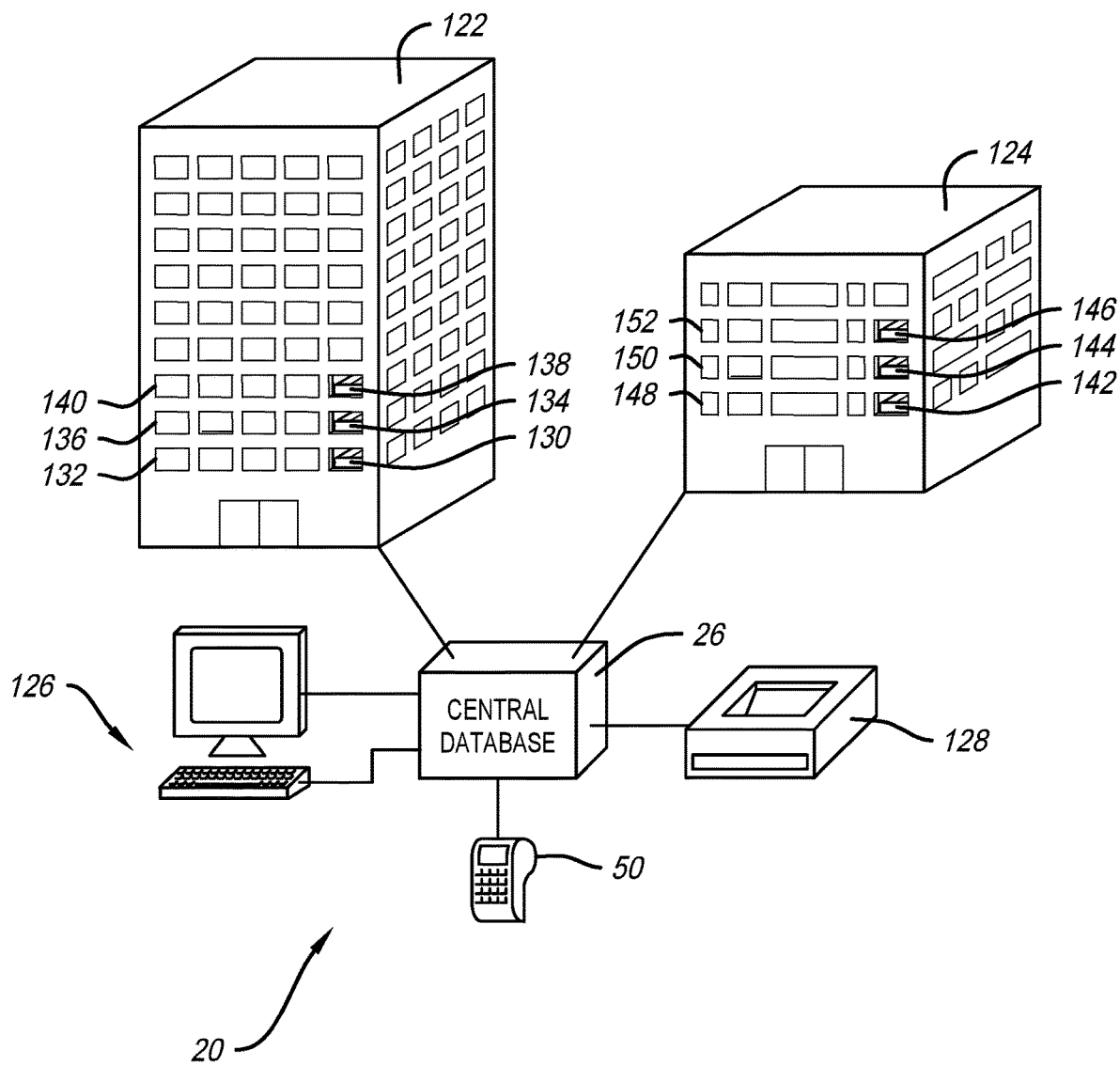
FIG. 9 is a diagrammatic view further illustrating tracking connected devices within an office building and/or an apartment complex, and accessing their location information remotely by way of a desktop computer, the universal remote, or a smart assistant.

FIG. 9 illustrates another aspect of the product location system 20 disclosed herein, namely tracking and identifying the location of connected devices at different locations, including, e.g., an office building 122 and/or an apartment complex 124. As shown, the central database 26 may be in communication with one or both of the office building 122 and/or the apartment complex 124, such as by way of a wired communication network (e.g., a cable or fiber network hub, etc.) or wireless communication network (e.g., Wi-Fi, cellular, etc.). Location information regarding any connected device within either of the office building 122 or the apartment complex 124 may be accessed remotely, such as by way of a desktop computer 126, the universal remote 50, or a smart assistant 128 (e.g., Google home or Alexa).

In accordance with the embodiments discussed above, the central database 26 may retain specific location information for the connected devices within each of the office building 122 and/or the apartment complex 124 by way of the ad hoc peer-to-peer communication network 58, e.g., as disclosed above with respect to FIGS. 1 and 5. Specifically, the product location system 20 may locate connected devices on a per floor basis, such as by way of triangulation in and among multiple connected devices within the product location system 20. Such triangulation may occur in a single office or apartment (e.g., in and among connected devices owned by a single person or entity), or triangulation may occur within a broader network of connected devices that expands outside the single office or apartment and/or expands outside only those devices owned by a single person or entity. In the latter embodiment, the product location system 20 may include a common protocol or firmware that allows all common connected devices to passively communicate with one another in the background to enhance location identification services. As such, the product location system 20 may be able to provide location information that a sought after connected device is located within the office building 122 or the apartment complex 124, in addition to identifying the floor, office, or apartment within the office building 122 or the apartment complex 124.

Specifically, e.g., FIG. 9 illustrates that the product location system 20 may be able to identify that a first connected device 130 is located on a first floor 132 of the office building 122, a second connected device 134 is located on a second floor 136 of the office building 122, and a third connected device 138 is located on a third floor 140 of the office building 122, such as by way of the connected devices 130, 134, 138 communicating with one another within the ad hoc peer-to-peer communication network 58 utilizing the aforementioned triangulation. This may be true regardless whether the connected devices 130, 134, 138 are commonly owned, or owned by separate persons or entities. The same may be true with respect to identifying the location of a fourth through sixth connected devices 142, 144, 146 on various floors 148, 150, 152 within the apartment complex 124. Again, the more connected devices that can communicate with one another to identify location information, regardless of ownership, the higher the degree of triangulation information can be provided to the product owner for purposes of specifically locating the lost or misplaced connected device.

Another feature of the product location system 20 is the security of the information stored within the universal remote 50 and/or the central database 26. Security may be necessary in the event someone steals the universal remote 50 and/or attempts unauthorized access of the central database 26, such as for purposes of retrieving information regarding the location of connected devices stored by the product location system 20. As such, security mechanisms such as passwords or biometric data may be utilized to protect data information. For example, the user 76 may need to enter a password to gain access to the universal remote 50, which may have product location information stored therein (or accessible by way of the central database 26). Alternatively, the universal remote 50 may require input of biometric data such as a thumbprint or retinal scan. Here, information on the universal remote 50 and/or in the central database 26 may only be accessed by a user providing matching biometric data. As such, the universal remote 50 may only respond to user input matching security data, such as a password or biometric information. Although, of course, multiple persons may be granted access to use the universal remote 50 in the event multiple passwords or biometric data are registered therewith. Such feature may be utilized by multiple members of a family (e.g., husband, wife, kids, etc.). This way, all individuals associated with the product location system 20 can store and retrieve items at will, in accordance with the embodiments disclosed herein.

Another aspect of the product location system 20 disclosed herein is that the universal remote 50 may interoperate with an inventory control system that analyzes commands (e.g., voice-activated commands) to execute instructions and search for keywords, and input information into the database, such as the one disclosed in U.S. Pat. No. 8,577,759, the contents of which are herein incorporated by reference in its entirety. As such, with that information, the user 76 may retrieve the location of connected devices within the product location system 20 by simply speaking one or more commands into the universal remote 50 and/or, e.g., by way of interaction with the smart assistant 128. The product location system 20 may recognize and respond to commands to help the user 76 more quickly locate connected devices within the product location system 20.

Another feature of the product location system 20 may be the use of a "snapshot" feature that activates all connected devices at once to create an instant full inventory catalog of connected devices. In one embodiment, the "snapshot" feature may activate all connected devices owned by a particular user (regardless where located), such as for generating an accounting of personal items for insurance purposes; or the "snapshot" feature may activate certain connected devices within a selected geographic area (e.g., within the house 72, the office building 122, the apartment complex 124, etc.). As mentioned above, as long as one of the connected devices is able to receive the activation request for said "snapshot" feature (e.g., from the universal remote 50 or the central database 26), the request may be designed to propagate through all connected devices that may be in communication with one another, regardless whether in direct communication with the universal remote 50 or the central database 26.

Moreover, in another embodiment where product location may be tracking in real-time, identifying the movement of connected devices within a particular geographic location (e.g., the house 72, the office building 122, the apartment complex 124, etc.) when a security system is armed may allow the product location system 20 to identify instances of potential theft. Thus, even though the alarm system itself may not pick up movement of an intruder within a room (e.g., due to the lack of a motion sensor therein), unexpected movement of a connected device therein may be sensed wirelessly by connected devices in adjacent rooms. Such unexpected movement may generate an alert of suspicious activity, which may be relayed to the user 76 by way of the universal remote 50. Moreover, such feature may also be integrated in a home/away mode regardless whether the user 76 has an alarm system. That is, when the product location system 20 determines that the user 76 is away from the house 72 (e.g., by way of geo-locating the location of the universal remote 50 in real-time), movement of connected devices in the house 72 while the user 76 is "away" may also be a sign of theft, whereby the product location system 20 may generate or push a notification to the user 76.

In one aspect of the product location system 20 disclosed herein, any of the connected devices may be entered into the central database 26 of the product location system 20 by way of the universal remote 50; although, any of the connected devices may also be entered manually or by another device, such as any third party device that may run compatible software or firmware for translating location data for the connected device into the central database 26. In this respect, the universal remote 50 and/or any powered third party device may initiate obtaining information from the connected device (e.g., with presentation of proper security credentials) to be entered into the product location system 20 by initiating a query, especially in the case of adding unpowered/passive connected devices. One process for inputting information into the central database 26 may follow that as disclosed in U.S. Pat. No. 8,577,759, the contents of which are herein incorporated by reference in its entirety.

Figure 10:
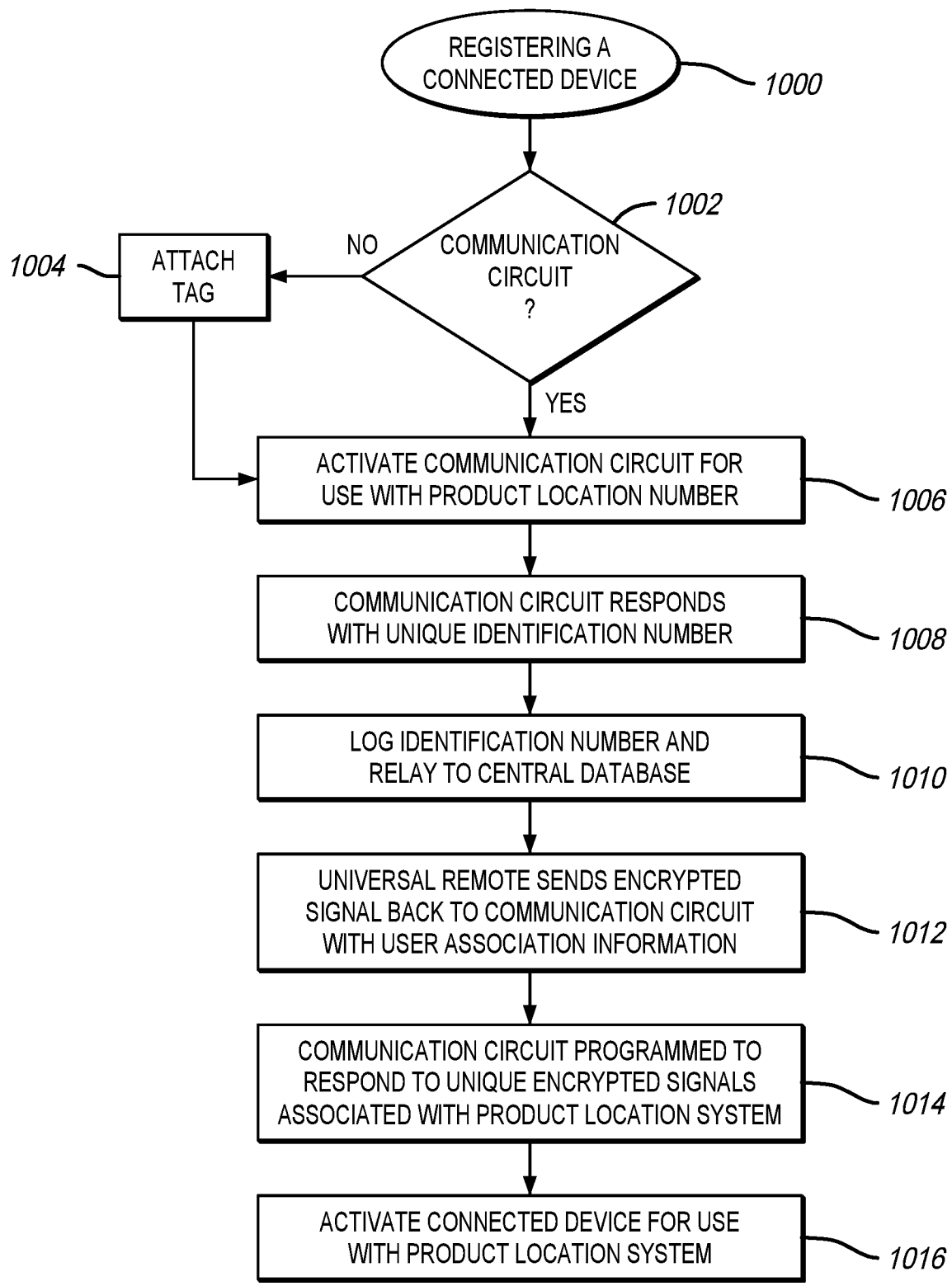
FIG. 10 is a flowchart illustrating a process for registering a connected device with the product location system.

FIG. 10 illustrates a sample process for registering a connected device (1000) into the product location system 20. Specifically, the first step is to determine whether the product includes an enabled communication circuit as part of step (1002). In the event the product does not include a communication circuit (e.g., keys, reading glasses, clothing items, and other products that may not have built-in electronics), then a communication circuit, such as the aforementioned tag 34, should be attached to the product as part of step (1004). Alternatively, if the connected device already includes a communication circuit (e.g., electronic devices such as Smartphones, smart watches, computers, etc.), then the next step would be to activate the tag 34, or program an existing communication circuit attached to the product, to be responsive with the product location system 20, as part of step (1006). Here, the user 76 may use biometric data such as a fingerprint or iris scan to generate an encrypted and unique authentication code to program the communication circuit for entry into a user account associated with the product location system 20. The unique identification code allows the connected device to respond to the communication protocol of the product location system 20, and not a miscellaneous stray code that may be emitted by a randomly generated signal from an illicit reader. The communication circuit associated with the connected device identifies the request to authenticate and activates the communication circuit for use with an encrypted and/or unique identification signal associated with the product location system 20. The communication circuit associated with the connected device may then respond with a unique identification number specific to that particular product as part of step (1008). This unique identification number is much like a serial number so the product location system 20 can uniquely identify the connected device when, e.g., the user 76 decides to search for the associated product. Accordingly, the identification number may be logged by the universal remote 50 and relayed to the central database 26 as part of a step (1010). The identification number may be stored in a remote database keyed only for access by authorized users. The universal remote 50 may then send an encrypted signal based on the authorized user's unique personal information back to the communication circuit as part of step (1012). Here, the communication circuit may be essentially programmed to respond to unique encrypted signals associated only with the product location system 20 owned by the user 76 as part of step (1014). Thereafter, the connected device is activated for use with the product location system 20 as part of step (1016).

Figure 11:
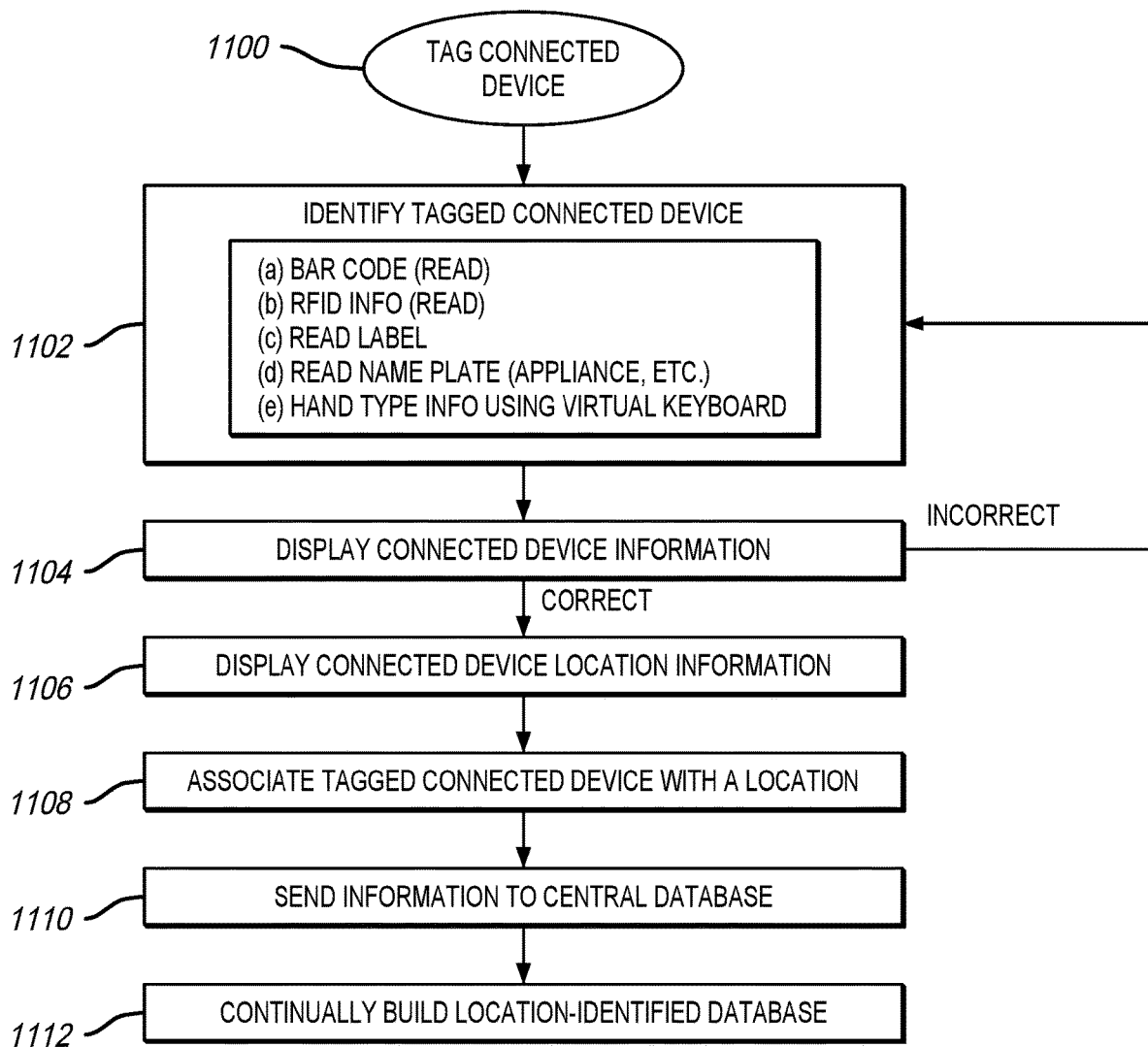
FIG. 11 is a flowchart illustrating a process for tagging a connected device and building a location-identified database.

FIG. 11 further illustrates a process (1100) for tagging the connected device with the tag 34 for use in connection with the product location system 20 disclosed herein. This may occur as part of step (1004) illustrated in FIG. 10, when the connected device needs the tag 34 because it does not already have a communication device integrated and/or associated therewith. This may include attaching the tag 34 to the connected device the user 76 endeavors to track or otherwise easily locate by way of the product location system 20 disclosed herein. In this respect, the tag 34 may vary in size, shape, and/or configuration depending on the connected device to which the tag 34 will attach. For example, in one embodiment, the housing 38 of the tag 34 may include an adhesive initially covered by a protective sheath. Upon deployment, the protective sheath is removed, thereby exposing the adhesive underneath for attachment to a smooth surface of the connected device. Such a feature may be particularly suitable for connected devices that include commensurate smooth surfaces, such as TVs that do not already include a communication circuit integrated therewith. Of course, the adhesive should have a strength suitable to keep the tag 34 substantially attached to the connected device over the long-term, including for connected devices that may be regularly used and/or transported.

Additionally, the housing 38 may be flexible such that the tag 34 may adhere to non-planar surfaces. For example, in one embodiment, the tag 34 may be a printed RFID circuit with an adhesive on one side, wherein the tag 34 may be wrapped around the frame of eye glasses. In another embodiment, the tag 34 may include structural characteristics (e.g., loopholes, key rings, apertures, etc.) suitable for attaching the tag 34 to a set of keys, bags, jewelry, etc.

Once tagged as part of step (1100), the user 76 may be given an option to identify the connected device as part of a step (1102), such as with the universal remote 50 or another device that facilitates information input. In one embodiment, the universal remote 50 may actively read the barcode off the retail product packaging or obtain the product information from an RFID circuit embedded within the inside of the product packaging (or otherwise initially attached to the product itself). Alternatively, the universal remote 50 may be able to read the product label or a nameplate associated with the connected device, and compare the image to an online product catalog database to obtain product information related thereto. Alternatively, the user 76 may simply manually enter the information into a virtual keyboard associated with the universal remote 50 (e.g., as "glasses", "wallet", etc.). The user 76 may also be given the option to take a picture of the connected device for storage in connection with the naming information and/or other product details, e.g., for differentiating like named connected devices from one another.

The next step (1104) may be for the universal remote 50 to display the product information for the now identified connected device. If the information is incorrect, the user 76 may be directed back to step (1102) to reenter the information for the connected device. Alternatively, once the displayed connected device information is correct as part of step (1104), the next step (1106) is for the universal remote 50 to display the immediate location information associated with the tagged connected device. Here, the immediate location information may be displayed on the universal remote 50, or it could be shown on another display device, such as the smart TV 56 in communication with the product location system 20. Of course, the location information may be displayed to the user 76 by way of any display device known in the art. In one embodiment, the universal remote 50 may display the location information on any compatible LCD screen or the like. Alternatively, the connected device location information may also be conveyed by an audio system (e.g., headphones, one or more speakers, etc.) as part of step (1106). In another example, the user 76 may simply interact with the Google Home product manufactured and sold by Google LLC of 1600 Amphitheatre Parkway, Mountain View, Calif. 94043 and/or the Alexa and/or Echo products manufactured and sold by Amazon Technologies, Inc. of Terry Ave. North, Seattle, Wash. 98109. Here, the location information may be conveyed to the user 76 by audio only (e.g., spoken by the Google Home or Amazon Alexa/Echo products), by visual display (e.g., on an associated LCD screen), or a combination of visual and audio.

In the next step (1108), the user 76 may be able to associate location information with the tagged connected device based on its current location. For example, if the connected device is currently in the kitchen, the user 76 may be able to associate the location information with a "kitchen" location. Next, the information related to the tagged connected device, along with its location information, is then sent to the central database as part of step (1110). The process for tagging connected devices and entering the same into the product location system 20 as part of the process (1100) illustrated in FIG. 11 continues as needed and/or desired for connected devices owned by the user 76. In this respect, in step (1112), the central database 26 may continually build a location-identified database by way of the location information sent to the central database 26 by the universal remote 50 or the like as part of the process (1100). That is, the product location system 20 may be able to better associate custom tag location information within a certain geographic area (e.g., within the house 76) based on input provided by the user 76 as part of the process (1100) illustrated in FIG. 11.

Figure 12:
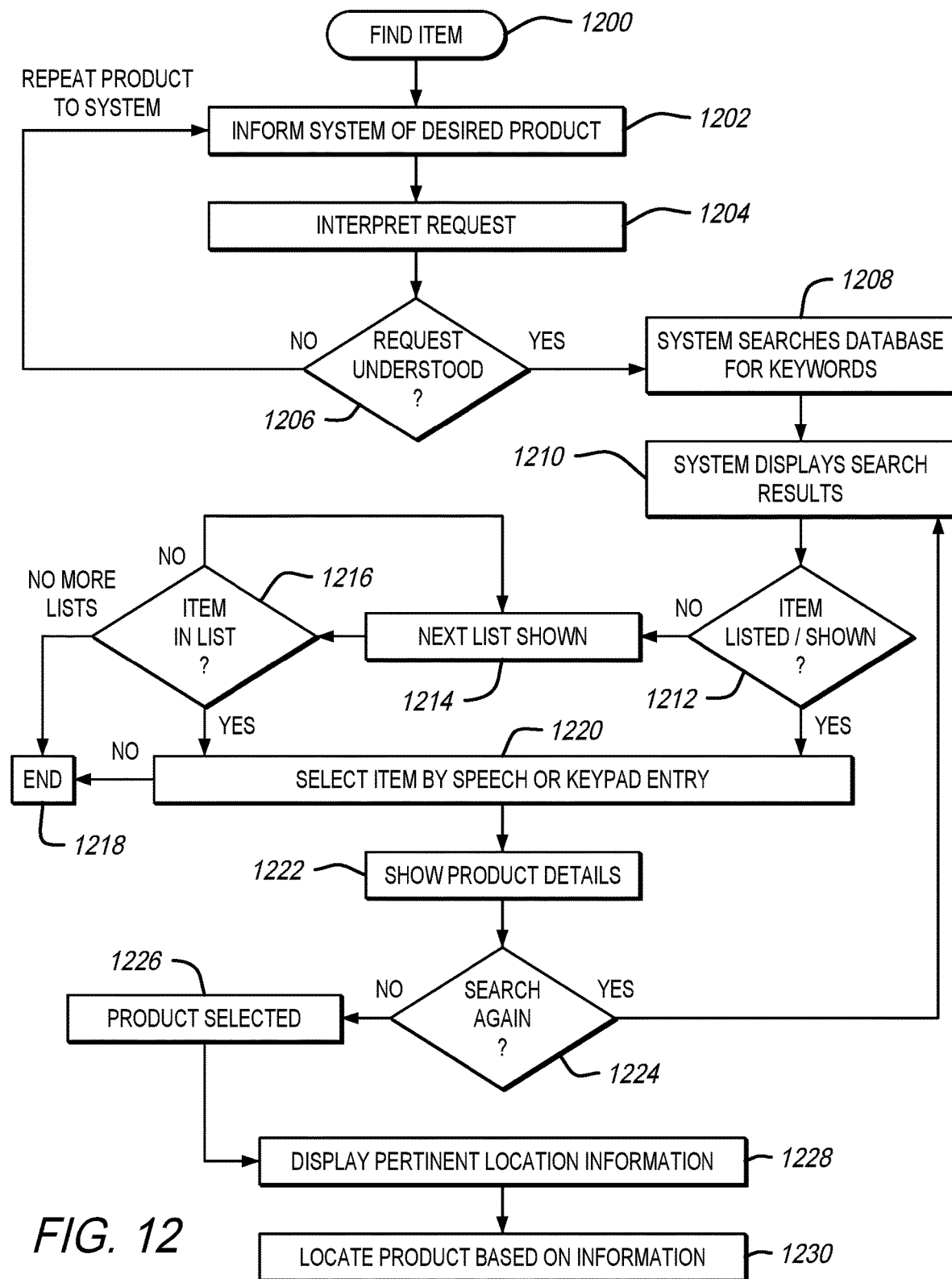
FIG. 12 is a flowchart illustrating a process for locating a connected device within the product location system.

FIG. 12 illustrates a process (1200) for finding one of the connected devices within the product location system 20. Again, the universal remote 50 or a comparable device (e.g., the smart device 128 such as Google Home or the Amazon Echo or Alexa products) may be used to find the connected device, including as part of the embodiment illustrated with respect to the process (1200) in FIG. 12. More specifically, the first step in the process (1200) is to inform the system 20 of the desired connected device the user 76 endeavors to find as part of a step (1202). This may include inputting a verbal command or inputting a keyboard/keypad entry in the form of a request to "find", "locate", "search", etc. for the connected device. For example, the user 76 may provide the verbal command "find my reading glasses". The universal remote 50 or a like device may then parse out the command into segments as part of interpreting the command in a step (1204). For example, when the user 76 speaks the phrase "find my reading glasses," the product location system 20 may parse out the word "find" from the rest of the statement that requests the "reading glasses". Such parsing may process on the backend as part of an integrated speech recognition software program able to receive and interpret the request as part of step (1204). In this respect, the system 20 must then determine whether the request has been understood, as part of a step (1206). If the request is not understood, the user 76 may be again prompted to inform the system 20 of the desired connected device as part of the step (1202). Here, the user 76 may speak the request again, or use an alternate input such as a virtual keyboard. Although, of course, other forms of input may be used such as a touch screen interface, stylus, mouse, etc. Alternatively, when the request is understood as part of step (1206), then use of the word "find" (or the like) will initiate searching the central database 26 for the desired connected device matching the keyword "reading glasses", such as part of a step (1208).

More specifically, the system 20 searches either the universal remote 50 or the central database 26 in step (1208), such as by comparing direct or related keywords to product descriptions of connected devices stored therein. In the case of searching the product location system 20 for "reading glasses", the search logic engine may perform an algorithmic search similar to that of an internet search engine (e.g., Google), namely the system 20 may search for more than just the exact phrase "reading glasses". In one embodiment, the system 20 may search for similar variants such as "glasses" in general, or other more generic or combined words that may be similar in substance or meaning and interpreted by the search logic engine as being similar to the spoken phrase "reading glasses", and especially so if the system 20 does not find an identical match.

The search results may then be displayed as part of step (1210), such as on the universal remote 50 or the smart TV 56 for viewing by the user 76. The user 76 may then scroll through one or more results to find the desired connected device the user 76 endeavors to locate. If the user 76 determines that the connected device is not listed or shown as part of a step (1212), the user 76 may opt to show the next list as part of step (1214) as part of determining whether the desired connected device is listed in the system 20 at all. If the user 76 decides the desired connected device is again not shown as part of a step (1216), the user 76 may repeat the process of obtaining another list as part of step (1214) until the connected device is shown and can be selected. Otherwise, the user 76 may need to simply end the search (1218) if the desired connected device has not been registered with the product location system 20, such as by way of the process (1000) illustrated with respect to FIG. 10. If the scroll feature is able to show each product in the search without the need to obtain additional lists or pages and the desired product is not listed, the user 76 may move immediately to step (1218), thereby bypassing steps (1214)-(1216).

If the desired connected device is shown in the list in either of steps (1212) or (1216), the user 76 may select the desired connected device by speech or keypad/keyboard entry as part of a step (1220). The location information is then retrieved from the universal remote 50 or the central database 26 and presented to the user 76 as part of a step (1222). The user 76 may be shown information such as a product description, a photograph of the product, a general location of the product, and a more specific (e.g., triangulated) location of the product. The user 76 may then be given the option to search again as part of step (1224), whereby the user 76 may opt to go back to step (1210) in the event the user 76 selected the wrong connected device or wants to search for a different connected device. Of course, the user 76 always has the option to simply restart the process (1200) to search for a new connected device. In one embodiment, the user 76 may be taken back to the previous list of tagged connected devices so the user 76 does not need to go back through each list. In the event all the tagged connected devices are listed on one scroll page, the user 76 may be taken back to the last viewed scroll point. Alternatively, the user 76 may confirm that the connected device selected is accurate at part of a step (1226), wherein the universal remote 50 then displays pertinent location information regarding the connected device as part of a step (1228) so the user 76 may locate the tagged connected device based on the then current location information, such as part of a step (1230). Here, in embodiments wherein the universal remote 50 is a Smartphone or similar electronic device having map software installed thereon, the universal remote 50 may provide directions to the location of the connected device. For example, in one embodiment, the directions may include driving directions from the house 72 to, e.g., the office building 122 of the user 76 where the connected device may be located.

In general, the product location system 20 is applicable to virtually any environment and can record virtually any tangible product as long as there is a communication circuit (e.g., the tag 34) associated therewith. While some embodiments disclosed herein reference the use of RFID chips for location tracking purposes, the product location system 20 is not necessarily limited to the size and/or functionality of RFID circuits because emerging technologies may enable the identification of smaller items that are otherwise unable to currently receive communication circuits. Alternatively, some products may include built-in transmitters/receivers (e.g., the smart TV 56) and may not otherwise need one of the tags 34. The universal remote 50 and the central database 26 may be remotely updatable with new menus as new products enter the market. A software or firmware update may easily occur over the Internet, via a flash update, or a system software update.

Figure 13:
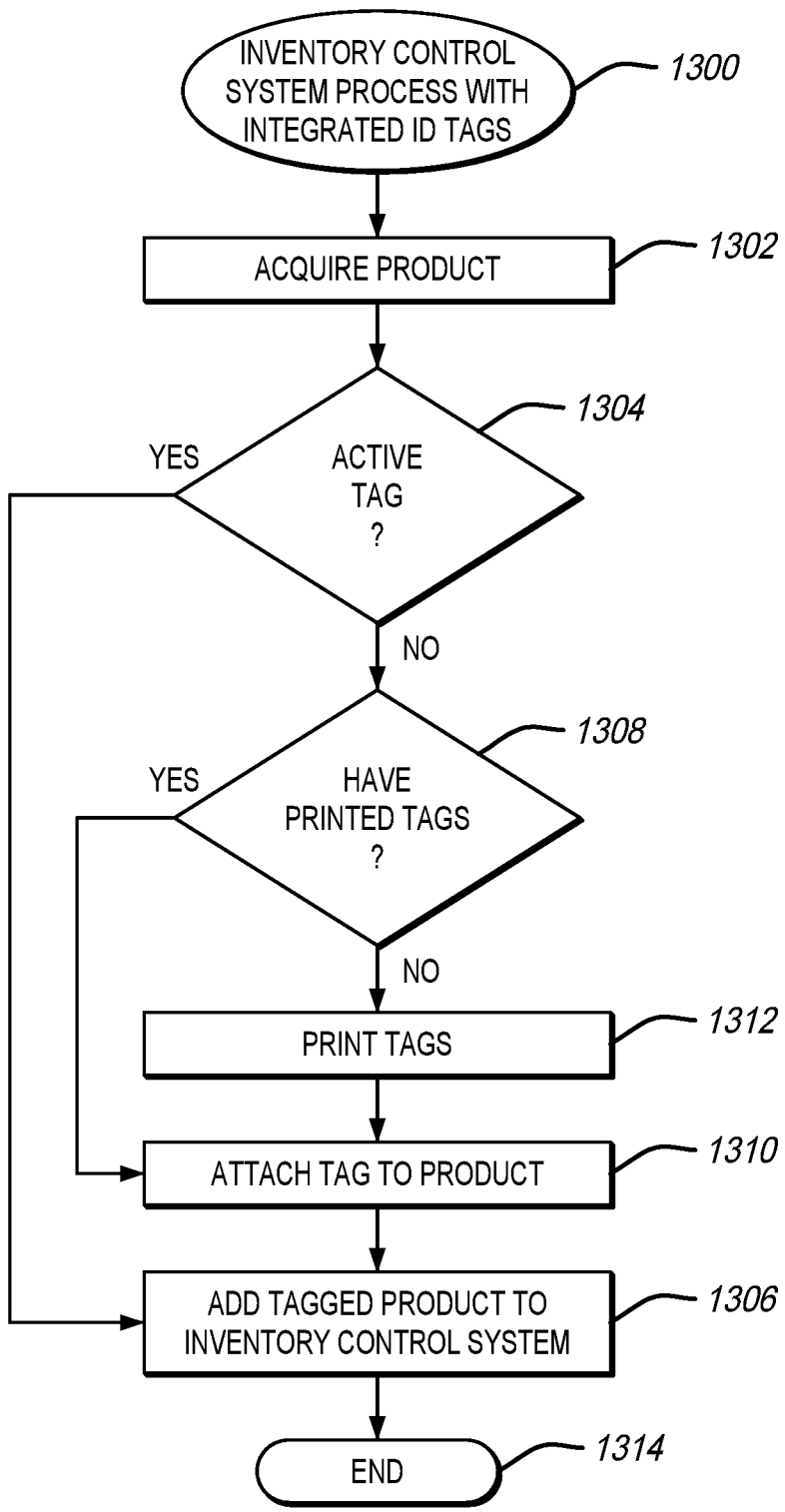
FIG. 13 is a flow chart of an inventory control system process with integrated ID tags as disclosed herein.

In another embodiment as disclosed herein, an inventory control system process with integrated ID tags (1300) is generally illustrated herein with respect to the flowchart of FIG. 13. The first step (1302) is to acquire a product to be entered into the inventory control system. This may be accomplished, e.g., by purchasing a product at the store, receiving the product as a gift, etc. Once the product is acquired as part of step (1302), the next step (1304) is to determine if the acquired product has an active tag. Products such as smart phones, computers (e.g., laptops, tablets, desktop computers, etc.), smart TVs, wireless routers, etc. may include an onboard communication circuit that allows the product to actively communicate (e.g., wirelessly or wired) when the product is powered by a battery or mains power supply. In circumstances when the acquired product already includes an active tag, then the acquired product may be immediately entered into the inventory control system as part of step (1306).

Figure 14:
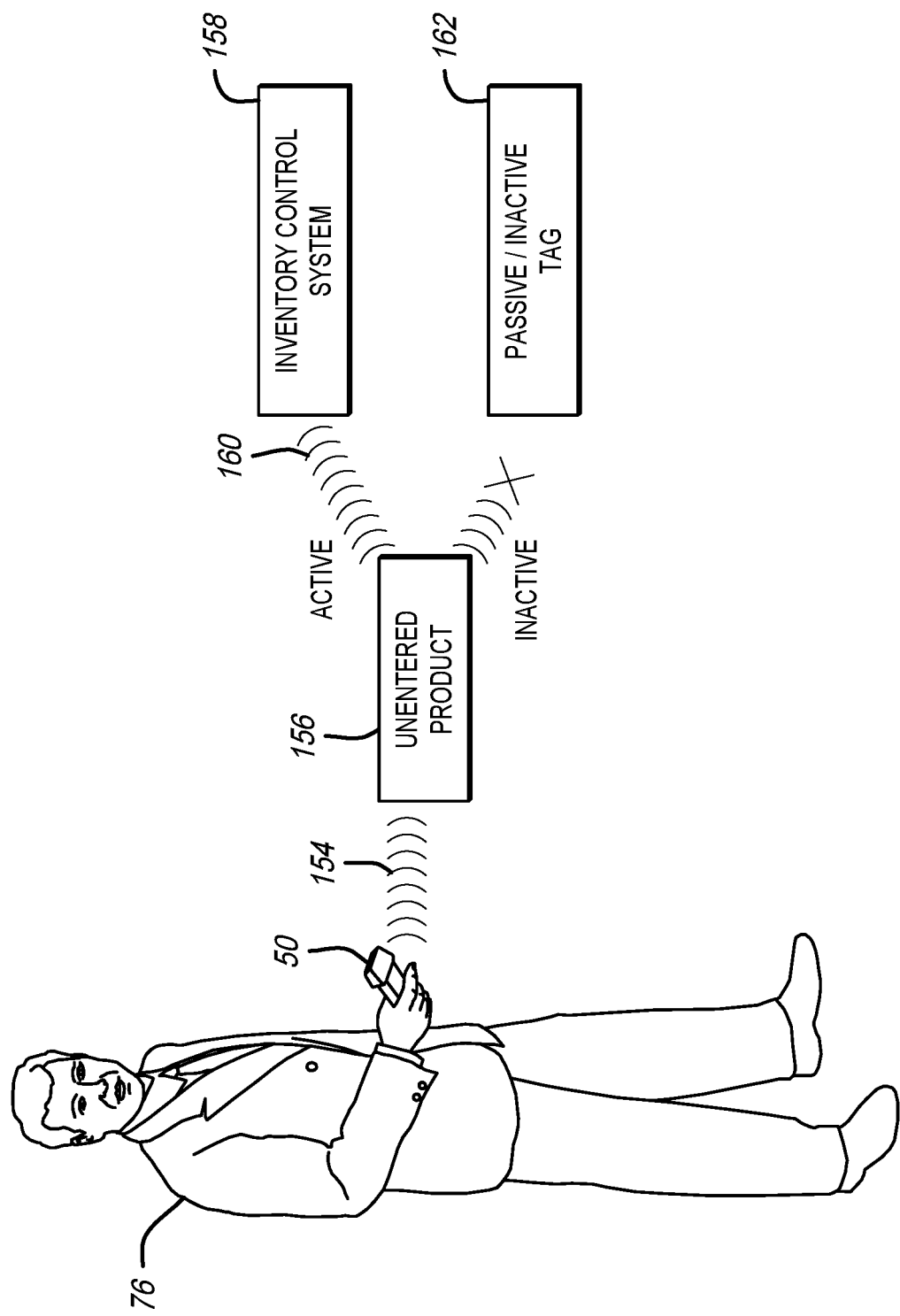
FIG. 14 is an environmental view illustrating registering a sample product with the inventory control system by way of the universal remote.

Here, e.g., as illustrated in FIG. 14, the user 76 may use the universal remote 50 to send an initiation interrogation signal 154 to an unentered product 156. In circumstances where the unentered product 156 includes an active tag as part of the determination step (1304), the unentered product 156 may be immediately entered into the and inventory control system 158 as part of step (1306). Specifically, for example, the initiation interrogation signal 154 may include registration information that provides or assigns the unentered product 156 with a sequential unique serial code or identification number that the unentered product 156 is then able to then relay to an inventory control system 158 by way of an active communication signal 160 for registration therewith. The initiation interrogation signal 154 may include additional information such as Wi-Fi connection credentials (e.g., wireless access point and/or password information) for seamless connection to and registration with the inventory control system 158 once the unentered product 156 receives its unique serial code or identification number from the universal remote 50 by way of the initiation interrogation signal 154. Although, of course, the unentered product 156 may communicate with other wireless and/or wired devices that may form part of the ad hoc peer-to-peer communication network 58, as discussed in detail above. Once registered with the inventory control system 58, the registration process (1300) then ends as part of step (1314) as the tag has been entered into the inventory control system as part of step (1306).

Alternatively, if the unentered product 156 includes a passive/inactive tag 162, or no tag at all, then the unentered product 156 is unable to send the active communication signal 160 to the inventory control system 158 as part of step (1306). As such, in situations where the unentered product 156 is determined in step (1304) not to have an active tag, the next step is to determine whether the user 76 has a printed tag for attachment to the unentered product 156, as part of step (1308). If the user 76 has one or more preprinted tags ready and/or available for use, the user 76 may proceed to the next step for attaching one of the tags to the product as part of step (1310). Alternatively, if the user 76 does not have one or more of the preprinted tags ready and/or available for use as part of step (1308), then the next step would be to print tags as part of step (1312).

Figure 15:
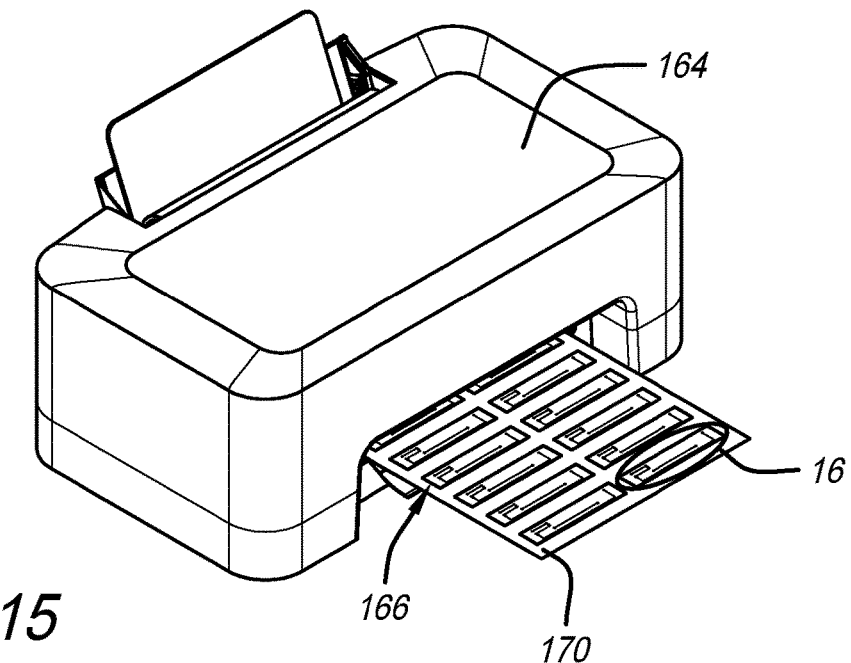
FIG. 15 is an environmental perspective view illustrating printing a set of passive circuits with conductive ink to a set of individually removable adhesively backed ID tags integral with a sheet of paper.
Figure 16:
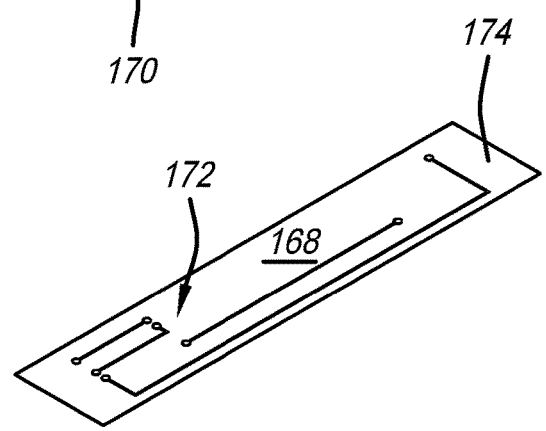
FIG. 16 is an enlarged perspective view taken about the circle 16 in FIG. 15, more specifically illustrating one of the passive circuits printed to one of the adhesively backed ID tags with conductive ink.
Figure 17:
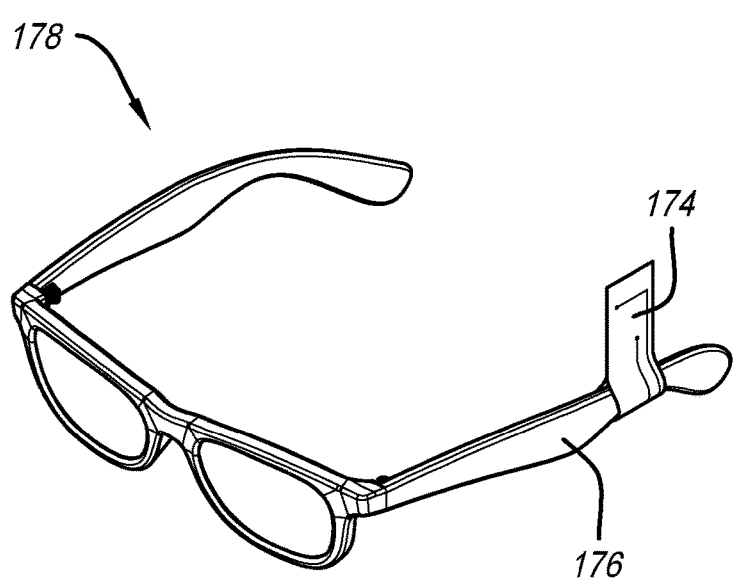
FIG. 17 is an environmental perspective view illustrating attachment of one of the individually removable adhesively backed ID tags having the passive circuit printed thereto to a pair of eyeglasses.

In circumstances where the user does not have a set of printed tags available as part of step (1308), then the next step would be to print a set of tags (1312) so a tag can be attached to the product as part of step (1310), which then enables the user 76 to add the now tagged product to the inventory control system as part of step (1306). In this respect, FIG. 15 illustrates one embodiment of a printer 164 applying a conductive ink 166 to a top surface 168 (best shown in FIG. 16) of a sheet of paper 170. The conductive ink 166 applied to the top surface 168 of the sheet of paper 170 may form a passive circuit 172 thereon able to receive and/or transmit information, such as when energized by an external reader or the like as known in the art. Moreover, the sheet of paper 170 may be perforated (not shown) such that individual strips having the conductive ink 166 thereon may be separated into a set of individual adhesively backed ID tags 174, one of which is more specifically illustrated in the enlarged perspective view of FIG. 16. The adhesively backed ID tag 174 may include a backing (not shown) selectively removable therefrom to expose an adhesive underneath. As such, e.g., FIG. 17 illustrates one configuration where the backing has been removed to expose the underlying adhesive such that opposite ends of the adhesively backed ID tag 174 can be folded about itself around an arm 176 of a pair of eyeglasses 178 for attachment thereto. Although, of course, in alternative embodiments, the adhesively backed ID tag 174 may attach to a relatively smooth surface, such as along the length of the arm 176. Alternatively, and/or in addition to, in embodiments wherein the adhesively backed ID tag 174 is substantially flexible, the tag 174 with the passive circuit 172 formed thereon may conform to an external surface of a product that is desired to be tracked, even if that external surface is not exactly planar (e.g., rounded, bumpy, jagged, etc.).

Figure 18:
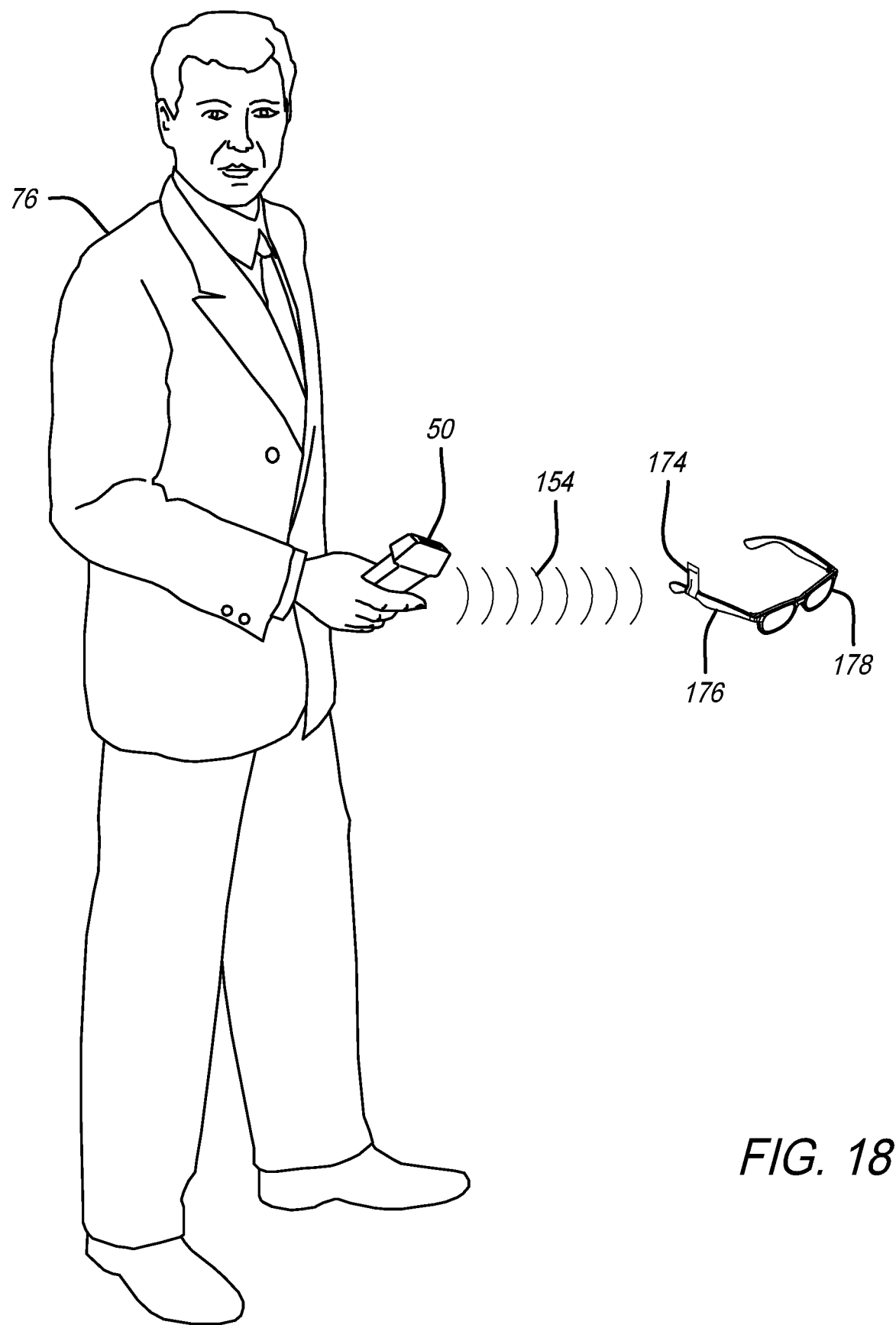
FIG. 18 is an environmental perspective view similar to FIG. 14, further illustrating registering the pair of eyeglasses with the inventory control system by way of the now attached ID tag and the universal remote.

Attachment of the adhesively backed ID tag 174 to the arm 176 as part of step (1310) results in a previously untagged and non-trackable product, such as the pair of eyeglasses 178 illustrated in FIG. 17, now being able to send and/or receive data communications for tracking information within the inventory control system. In this respect, FIG. 18 illustrates one embodiment of the user 76 using the universal remote 50 to send the initiation interrogation signal 154 to the adhesively backed ID tag 174 coupled to the eyeglasses 178 about the arm 176. That adhesively backed ID tag 174 may then communicate back with the universal remote 50 (which may directly transmit the newly added inventory to the inventory control system 158), or the passive circuit 172 may directly communicate with the inventory control system 158 (e.g., such as by way of a remote reader, wireless router, and/or other wired and/or wireless devices as disclosed herein). Once the previously unentered product 156 is tagged and entered into the inventory control system, the process (1300) ends as part of step (1314).

As part of the step for printing tags (1312), the inventory control system 158 may impart the conductive ink 166 to the top surface 168 of the sheet of paper 170 in a manner that uniquely identifies the resulting passive circuit 172 formed thereon. In one embodiment, the inventory control system 158 may maintain a database of products therein such that each passive circuit 172 is sequentially numbered with an identification code that is unique relative to any other active tag and/or passive circuit 172 already in the inventory control system 158. This may help ensure that the user 76 can quickly identify unique products within the inventory control system 158.

The inventory control system 158 may communicate with the printer 164 so that the passive circuits 172 are printed based on current and/or anticipated inventory of products within the inventory control system 158. The inventory control system 158 may maintain records of sequentially numbered active circuits and/or passive circuits 172 within the system 158 in real-time so the printer 164 does not print duplicates. As an example, the inventory control system 158 may enter active circuits as part of the step (1306) sequentially numbered as 000001-000006. Subsequently, the printer 164 may print a set of the uniquely identified passive circuits 172 sequentially numbered as 000007-000015. Thereafter, the next active circuit entered by the inventory control system 158 or printed as the passive circuit 172 by the printer 164 would be sequentially numbered as 000016. This would occur regardless whether any of the previously printed and sequentially numbered passive circuits 172 (i.e., those identified as 000007-000015) were used to identify a product and entered into the inventory control system 158, so as to prevent duplicates. This feature, e.g., ensures that each active communication circuit and/or the printed passive circuit(s) 172 retain a unique identification number within the inventory control system 158. Of course, any of the previously printed passive circuits 172 identified as 000007-000015 could be used at a later date to identify another passive product, despite the fact that additional active tags (or the passive circuits 172) may have been assigned a higher unique identification number and entered into the inventory control system 158 before those passive circuits 172 that may have been previously printed by the printer 164.

Creating the passive circuits 172 at home by way of the conductive ink 166 is a fraction of the cost for producing unique identification tags relative to those known in the art, such as the Orbit and/or the Apple AirTag products. For example, in one embodiment, it may cost as little as a few cents for the user 76 to create multiple of the passive circuits 172 attachable to products that do not otherwise have an active tag for location tracking purposes. Moreover, the inventory control system 158 may store unique product identification information in connection with the unique code assigned to each active circuit and/or the passive circuits 172. This allows the inventory control system 158 to differentiate various products stored therein, and enables the user 76 to retrieve product specific information from the inventory control system 158 (e.g., such as by way of the universal remote 50) in real-time. As an example, the product information may be keyword searchable within the inventory control system 158. Moreover, the unique identification codes can also be customizable by the user 76, and are not necessarily limited only to sequential numbers. For example, the unique identification code may be an alphanumeric character. Moreover, in another embodiment, the passive circuit 172 may be a one or two dimensional QR code scannable by the universal remote 50 for automatic entry into the inventory control system 158.

Although several embodiments have been described in detail for purposes of illustration, various modifications may be made without departing from the scope and spirit of the invention. Accordingly, the invention is not to be limited, except as by the appended claims.

What is claimed is:

1. An inventory control system process, comprising the steps of:
    printing a circuit to a sheet stock having at least one ID tag formed therewith, the circuit being carried by the ID tag;
    assigning a unique identification code to the circuit associated with the ID tag;
    removing the ID tag carrying the circuit from the sheet stock;
    associating the removed ID tag with a product;
    affiliating the product with a custom tag location entered by a product owner;
    entering the product and the custom tag location into an inventory control system secured in connection with a user account accessible only by the product owner or an authorized user associated with the user account, for real-time location tracking of the product thereof by way of the circuit; and
    cataloging a real-time location of the product responsive to an activation request sent by the product owner or the authorized user, wherein the activation request propagates from the product to at least one other product entered into the inventory control system.

2. The process of claim 1, wherein the ID tag comprises an adhesively backed ID tag.

3. The process of claim 2, wherein the associating step includes the step of bending the adhesively backed ID tag and the circuit thereon about at least a portion of the product for attachment thereto, the circuit remaining communicatively operational thereafter.

4. The process of claim 1, wherein the assigning step includes printing the unique identification code or a QR code to the sheet stock.

5. The process of claim 1, wherein the assigning step includes the step of programming the circuit with the unique identification code.

6. The process of claim 1, wherein the unique identification code comprises an alphanumeric code.

7. The process of claim 1, wherein the circuit comprises passive circuit formed from a conductive ink printed to the sheet stock.

8. The process of claim 1, wherein the sheet stock includes at least two columns of ID tags.

9. The process of claim 1, wherein the assigning step includes the step of embedding the unique identification code within the circuit.

10. The process of claim 1, including a step of acquiring the unique identification code from a server.

11. The process of claim 10, wherein the server comprises a local server and the unique identification code comprises a user customizable identification code.

12. The process of claim 10, wherein the server comprises a cloud-based server having a plurality of user accounts and the product comprises a plurality of products, wherein each of the plurality of products are associated with at least one of the plurality of user accounts in the cloud-based server.

13. The process of claim 12, wherein the entering step includes assigning an access right to each of the plurality of user accounts and transmitting real-time tracking information regarding each of the products associated with one of the plurality of user accounts to the product owner or the authorized user having the access right of the corresponding user account.

14. The process of claim 1, wherein the entering step includes the step of scanning a code associated with the ID tag and the product.

15. The process of claim 14, wherein the code comprises a barcode or a QR code.

16. The process of claim 1, wherein the circuit comprises a plurality of circuits and the ID tag comprises a plurality of ID tags, each of the plurality of ID tags having one of the plurality of circuits associated therewith.

17. The process of claim 1, wherein the ID tag comprises a flexible material bendable around an eyeglasses arm.

18. The process of claim 1 wherein the activation request is sent to a specified area selected by the product owner or the authorized user.

19. An inventory control system process, comprising the steps of:
    printing a circuit to a sheet stock having at least one ID tag formed therewith, the circuit being carried by the ID tag;
    assigning a unique identification code to the circuit associated with the ID tag;
    removing the ID tag carrying the circuit from the sheet stock;
    associating the removed ID tag with a product;
    affiliating the product with a custom tag location entered by a product owner; entering the product and the custom tag location into an inventory control system secured in connection with a user account accessible only by the product owner or an authorized user associated with the user account, for real-time location tracking of the product thereof by way of the circuit; and
    cataloging a real-time location of the product responsive to an activation request sent to a specified area selected by the product owner or an authorized user.

20. The process of claim 19, wherein the ID tag comprises an adhesively backed ID tag.

21. The process of claim 20, wherein the associating step includes the step of bending the adhesively backed ID tag and the circuit thereon about at least a portion of the product for attachment thereto, the circuit remaining communicatively operational thereafter.

22. The process of claim 19, wherein the assigning step includes printing the unique identification code or a QR code to the sheet stock.

23. The process of claim 19, wherein the assigning step includes the step of programming the circuit with the unique identification code.

24. The process of claim 19, wherein the unique identification code comprises an alphanumeric code.

25. The process of claim 19, wherein the circuit comprises passive circuit formed from a conductive ink printed to the sheet stock.

26. The process of claim 19, wherein the sheet stock includes at least two columns of ID tags.

27. The process of claim 19, wherein the assigning step includes the step of embedding the unique identification code within the circuit.

28. The process of claim 19, including a step of acquiring the unique identification code from a server.

29. The process of claim 28, wherein the server comprises a local server and the unique identification code comprises a user customizable identification code.

30. The process of claim 28, wherein the server comprises a cloud-based server having a plurality of user accounts and the product comprises a plurality of products, wherein each of the plurality of products are associated with at least one of the plurality of user accounts in the cloud-based server.

31. The process of claim 30, wherein the entering step includes assigning an access right to each of the plurality of user accounts and transmitting real-time tracking information regarding each of the products associated with one of the plurality of user accounts to the product owner or the authorized user having the access right of the corresponding user account.

32. The process of claim 19, wherein the entering step includes the step of scanning a code associated with the ID tag and the product.

33. The process of claim 32, wherein the code comprises a barcode or a QR code.

34. The process of claim 19, wherein the circuit comprises a plurality of circuits and the ID tag comprises a plurality of ID tags, each of the plurality of ID tags having one of the plurality of circuits associated therewith.

35. The process of claim 19, wherein the ID tag comprises a flexible material bendable around an eyeglasses arm.

* * * * *